(12) United States Patent
Quintel et al.

(10) Patent No.: US 8,048,299 B2
(45) Date of Patent: **\*Nov. 1, 2011**

(54) CROSSFLOW PRESSURE LIQUID FILTRATION WITH ULTRASONIC ENHANCEMENT

(75) Inventors: Mark A. Quintel, Kalamazoo, MI (US); Christopher S. Rau, Emmett Township, MI (US); Michael E. Isch, Vicksburg, MI (US)

(73) Assignee: Eaton Corporation, Cleveland, OH (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/798,691

(22) Filed: Apr. 9, 2010

(65) Prior Publication Data

US 2010/0193425 A1     Aug. 5, 2010

Related U.S. Application Data

(63) Continuation of application No. 12/290,729, filed on Nov. 3, 2008, now Pat. No. 7,722,767, which is a continuation of application No. 10/751,681, filed on Jan. 5, 2004, now Pat. No. 7,445,716.

(51) Int. Cl.
 *B01D 35/00* (2006.01)
(52) U.S. Cl. ...... 210/232; 55/350.1; 55/490; 210/321.8; 210/321.89; 210/323.2; 210/435; 210/456; 210/485
(58) Field of Classification Search .......... 210/232–234, 210/238, 314, 315, 321.79, 321.8, 321.87–321.89, 210/323.1, 323.2, 330, 335–338, 435, 440, 210/456, 483–485, 488, 457; 55/350.1, 490
See application file for complete search history.

(56) References Cited

U.S. PATENT DOCUMENTS

| | | | |
|---|---|---|---|
| 2,765,084 A | 10/1956 | Tursky | |
| 3,149,072 A | 9/1964 | Silverman | |
| 3,161,159 A | 12/1964 | Kritske | |
| 3,232,437 A | 2/1966 | Hultgren | |
| 3,262,570 A | 7/1966 | Gailitis et al. | |
| 3,372,073 A * | 3/1968 | Cutler | 156/69 |
| 3,438,502 A | 4/1969 | Schmidt, Jr. et al. | |
| 3,461,651 A | 8/1969 | Van Ingen | |
| 3,684,100 A | 8/1972 | Close | |
| 3,692,178 A | 9/1972 | Reece | |
| 3,713,540 A | 1/1973 | Davidson et al. | |
| 3,870,640 A | 3/1975 | Reece | |

(Continued)

FOREIGN PATENT DOCUMENTS

DE     38 11 706 A1     10/1989

(Continued)

OTHER PUBLICATIONS

Seminar Lecture (from www.healthsonics.com), Lecture presented 1990, dated Jul. 15, 1998, "The Ins and Outs of Ultrasonic Cleaning" by Howard Houke.

(Continued)

*Primary Examiner* — Joseph Drodge
(74) *Attorney, Agent, or Firm* — Daniel S. Kalka

(57) ABSTRACT

Methods and apparatus for increasing the duration of uninterrupted filtering flow by using crossflow filtration and ultrasonic energy in difficult to filter process liquids (e.g. of the kind having (1) a carrier liquid, (2) coalescing solids particles which tend to adhere and bridge filter element gaps sized substantially larger than such particles, and (3) larger impurity elements to be filtered out of such process liquid and sized larger than such filter element gaps).

21 Claims, 11 Drawing Sheets

U.S. PATENT DOCUMENTS

| | | | |
|---|---|---|---|
| 3,976,577 A | 8/1976 | Kaiser | |
| 4,011,157 A | 3/1977 | Pennebaker, Jr. et al. | |
| 4,158,629 A | 6/1979 | Sawyer | |
| 4,193,009 A | 3/1980 | Durley, III | |
| 4,253,962 A | 3/1981 | Thompson | |
| 4,289,630 A | 9/1981 | Schmidt, Jr. et al. | |
| 4,337,158 A | 6/1982 | Bodine | |
| 4,409,005 A | 10/1983 | McKendrick | |
| 4,642,188 A | 2/1987 | DeVisser et al. | |
| 4,769,136 A | 9/1988 | McCormick et al. | |
| 4,802,487 A | 2/1989 | Martin et al. | |
| 4,836,922 A | 6/1989 | Rishel et al. | |
| 4,957,625 A | 9/1990 | Katoh et al. | |
| 5,059,331 A | 10/1991 | Goyal | |
| 5,062,965 A | 11/1991 | Bernou et al. | |
| 5,084,176 A | 1/1992 | Davis et al. | |
| 5,087,365 A | 2/1992 | Davis et al. | |
| 5,088,510 A | 2/1992 | Bannon | |
| 5,198,111 A | 3/1993 | Davis | |
| 5,298,161 A | 3/1994 | Sieg | |
| 5,343,443 A | 8/1994 | Merewether | |
| 5,395,592 A | 3/1995 | Bolleman et al. | |
| 5,484,528 A | 1/1996 | Yagi et al. | |
| 5,527,462 A | 6/1996 | Davis et al. | |
| 5,569,383 A | 10/1996 | VanderArk, Jr. et al. | |
| 5,785,870 A | 7/1998 | Davis et al. | |
| 5,792,373 A | 8/1998 | Bennick et al. | |
| 5,919,376 A | 7/1999 | Carman | |
| 5,951,456 A | 9/1999 | Scott | |
| 6,024,229 A | 2/2000 | Ayers | |
| 6,213,311 B1 | 4/2001 | Coric | |
| 6,251,294 B1 | 6/2001 | Davis et al. | |
| 6,395,186 B1 | 5/2002 | DeKock et al. | |
| 6,568,409 B1 | 5/2003 | Fleck | |
| 6,592,708 B2 | 7/2003 | Vanell | |
| 6,787,046 B2 | 9/2004 | DeKock et al. | |
| 6,878,294 B2 | 4/2005 | Ando et al. | |
| 7,008,540 B1 | 3/2006 | Weavers et al. | |
| 7,101,485 B2 | 9/2006 | Dubruque et al. | |
| 7,445,716 B2 * | 11/2008 | Quintel et al. | 210/636 |
| 7,722,767 B2 * | 5/2010 | Quintel et al. | 210/321.88 |

FOREIGN PATENT DOCUMENTS

| | | |
|---|---|---|
| DE | 42 26 445 A1 | 2/1994 |
| EP | 1 044 713 A1 | 10/2000 |
| FR | 1 509 352 | 1/1968 |
| FR | 2 742 352 | 6/1997 |
| GB | 1 275 037 | 5/1972 |
| JP | 10-244224 | 9/1998 |
| WO | WO 89/09646 | 10/1989 |
| WO | WO 02/072229 A1 | 9/2002 |

OTHER PUBLICATIONS

Printout from Worldwide Web (website unknown), (date unknown), 10 pages, "Index . . . Ultrasonic Cleaning Process . . . General Cleaning Instructions . . . Products", (author unknown).

Single Worldwide Web printout page from search: "Ultrasonic Consoles Stainless Steel Tanks", (undated), "Precision Cleaning System . . . ", web address www.tmasc.com, unknown author.

Web page from search: "Ultrasonic Cleaners", (undated), "All three NEY Ultrasonic cleaners . . . ", Web address www.hurricane.net , unknown author.

"The Use of Ultrasonic Cleaning for Ultrafiltration Membranes in the Dairy Industry", Paper #384, Shobha Muthukumaran, et al., Dept. of Chemical Engineering, School of Chemistry, The University of Melbourne (undated).

"Cleaning of organic and inorganic membranes with backwash enhanced by ultrasound", (from http://environ.jp/Hpmain/introduction/groups/membrane.html) dated Sep. 2, 2003 (3 pages), unknown author.

"Cross-flow filtration of fruit juice" (from http://www.mst.dk/udgiv/Publications/2000/87-7944-134-3/Html/kap09_eng.htm) dated Sep. 2, 2003 (9 pages), unknown author.

"Implementing Sintered Metal Filter Systems" by Kenneth L. Rubow and Louse Stange, (from http://www.chemicalprocessing.com/Web_First/cp.nsf/ArticleID/NJEC-4WYK9M/) dated Sep. 2, 2003 (5 pages), unknown author.

"Upgrade Fluid Catalytic Cracker Slurry Oil to Carbon Black Oil with Chemical Settling Aids" (from http://www.nalcoexxon.com) dated May 15, 2003 (4 pages), unknown author.

(Precision Cleaning) (PC), Mar. 1999, pp. 28-36 What's the Frequency? by Rick Reynolds.

(Parts Cleaning), May 1998, pp. 17-21, "How Now" by Harish A. Bhatt.

"Using Ultrasound to Reduce Ceramic Membrane Fouling by Silica Particles", Symposia Papers Presented Before the Division of Environmental Chemistry American Chemical Society, Apr. 7-11, 2002, unknown author.

"FCC Slurry Oil Filtration With Mott Hypulse® LSI Filters" Mott Corporation, Sep. 2000 (10 pages), unknown author.

* cited by examiner

CROSSFLOW PRESSURE LIQUID FILTRATION WITH ULTRASONIC ENHANCEMENT

CROSS REFERENCE TO RELATED APPLICATIONS

This application is a continuation of U.S. application Ser. No. 12/290,729, filed Nov. 3, 2008 (now U.S. Pat. No. 7,722,767), which is a continuation of U.S. application Ser. No. 10/751,681, filed Jan. 5, 2004 (now U.S. Pat. No. 7,445,716), hereby incorporated herein by reference.

FIELD OF THE INVENTION

This invention relates generally to crossflow industrial liquid pressure filter apparatus and methods, particularly for process liquids of the kind having (1) a carrier liquid, (2) coalescing solids particles which tend to stick together to bridge and thus blind a filter element gap which is sized larger than the width of such particles, and (3) larger impurity elements to be filtered out and which are sized larger than such a filter element gap.

BACKGROUND OF THE INVENTION

Ultrasonic energy has been applied to prior flow separation situations but, insofar as known to Applicants, not to crossflow filtration of liquids in the above mentioned field.

The Assignee of the present invention has developed, over time, filter systems for difficult to filter liquids, such as liquid solutions, suspensions and the like having a high solids content, particularly certain liquids of a viscous nature or otherwise having a high solids content such as colloidal gels, mineral and clay slurries, starch solutions, petroleum oil products and the like, in which the solids tend to coagulate or coalesce, wherein the filtering out of large impurity elements is a difficult problem.

Such problem was early recognized in, for example, Petter et al. U.S. Pat. No. 3,161,159, assigned to the Assignee of the present invention.

Subsequent Davis U.S. Pat. No. 5,198,111; Davis et al. U.S. Pat. No. 5,527,462 and Vander Ark U.S. Pat. No. 5,569,383, all assigned to the Assignee of the present invention, require, (per housing) a single, relatively large diameter, cylindrical filter element which uses barrier filtration flow from inside out. A cleaning member moves along the inlet surface of the filter element to mechanically wipe or scrape solids from the filter element gaps back into suspension in the liquid to be filtered.

Later DeKock et al. U.S. Pat. No. 6,395,186 provides such a wiper/scraper, barrier type, filter unit, in which plural ultrasonic transducers are spaced axially and circumferentially on the outside of the filter housing to assist barrier filtration of composite liquids including particularly aggressively coalescing solids particles, which would otherwise quickly blind the filter element at a commercially unacceptable rate.

The above discussed filter systems use barrier-type filtration processes, wherein all of the incoming process liquid must pass through the filter element to be stripped of unwanted relatively large impurity elements, namely those size of larger than the filter element gaps.

Further, each of the prior filter systems above discussed, has, within a given filter housing, only one or perhaps up to three, filter elements, and hence a relatively low area of filtration material (e.g. screen) per filter housing.

In a continuing effort to improve efficiency in filtering difficult liquids, particularly of the kind above discussed, Applicants have found that in certain situations, all of the process liquid, going to a user process, need not be filtered (e.g. in certain oil refinery processes). Moreover, Applicants have found that there is often very little space available for filtration equipment in a given liquid process installation, so as to make desirable the maximizing of filter media area while minimizing the outside dimensions of the filter housing.

Accordingly, the objects and purposes of the invention include provision of methods and apparatus for filtration, commercially acceptable flow rates and flow durations, using crossflow filtration and ultrasonic energy for preventing bridging of filter element gaps, without need for mechanical wiping/scraping, for difficult to filter process liquids (e.g. of the kind having (1) a carrier liquid, (2) coalescing solids particles which tend to stick together to bridge and thus blind a filter element gap sized larger than the width of such particles, and (3) larger impurity elements to be filtered out of such process liquid and sized larger than such a filter element gap).

SUMMARY OF THE INVENTION

This invention includes methods and apparatus for increasing the duration of uninterrupted filtering flow by using crossflow filtration and ultrasonic energy with in difficult to filter process liquids (e.g. of the kind having (1) a carrier liquid, (2) coalescing solids particles which tend to adhere and bridge filter element gaps sized substantially larger than such particles, and (3) larger impurity elements to be filtered out of such process liquid and sized larger than such filter element gaps).

DETAILED DESCRIPTION

Figure 1:
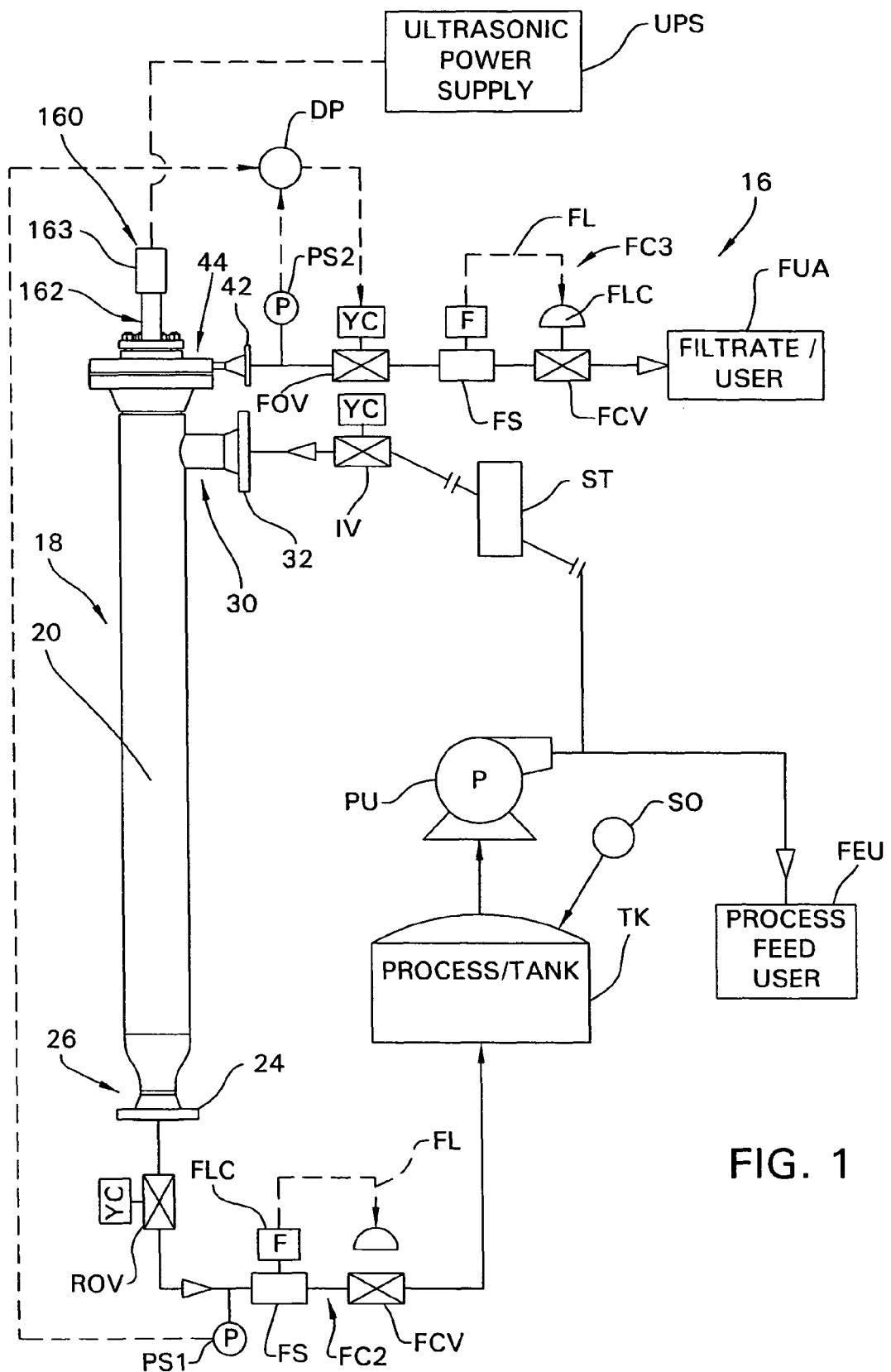
FIG. 1 is a schematic view of a filter system embodying the present invention.

A process liquid filtration system 16 (FIG. 1), embodying the present invention, includes a crossflow process liquid filter unit 18. The filter unit 18 includes an elongated, generally cylindrically shaped, filter housing 20 having a process liquid (feed) inlet port 30 and a process liquid (retentate) outlet port 26. The filter unit 18 also includes a filtered liquid outlet port 44.

The inlet port 30 is at the near upper portion of the housing 20 (FIG. 1) and is adapted to receive incoming feed liquid to be filtered. The inlet port 30 may be conventionally formed, e.g. here by a stub pipe 34 which opens to and extends radially from the housing 20.

The system 16 (FIG. 1) may be installed in parallel with a conventional process feed liquid user apparatus FEU fed by a pump PU from a process liquid tank TK, in turn fed from any convenient source SO of process feed liquid.

The feed pump PU (FIG. 1) also feeds process liquid from the tank TK through a strainer ST and a normally open inlet valve IV into the inlet port 30.

A major part of the feed liquid, propelled by the pump PU into the housing 20, simply passes unfiltered through the filter housing 20 in a crossflow manner, and exits through the retentate outlet 26 and a normally open retentate outlet valve ROV, preferably through a flow control FC2, back to the tank TK. The control FC2 here shown is of a conventional type, wherein a flow sensor FS outputs a signal (e.g. electrical) through a feedback loop controller FLC and feedback loop FL to vary the opening of a flow rate control valve FCV.

The filtered liquid (filtrate) outlet port 44 (FIG. 1) may be conventionally formed, e.g. hereby a relatively small diameter stub pipe 41 which opens to and extends radially from the top portion of the filter unit 18. The filtrate outlet port 44 connects through a normally open filtrate outlet valve FOV and a further flow control FC3 to any desired filtrate user apparatus FUA. The control FC3 may be a model Camflex II-style control valve, commercially available from Dresser Masoneilan located at Dresser, Inc. Valve Division, 85 Bodwell Street, Avon, Mass. 02322-1190 USA. The control FC2 is conveniently similar to control FC3.

The aforesaid liquid connections to the ports 30, 26 and 44 may be by any conventional means, for example conventional respective flanges 30, 24 and 42, as seen in FIG. 1.

A first pressure sensor PS1 senses liquid pressure in the retentate outlet line, here between the retentate outlet valve ROV and the flow control FC2. Similarly, a second pressure sensor PS2 samples liquid pressure in the line between the filtrate outlet 44 and the filtrate outlet valve FOV. The pressure sensors PS1 and PS2 output signals, corresponding to the pressure in their respective liquid lines, to a differential pressure responsive control DP which provides a control output to the filtrate outlet valve FOV to close same, when the liquid pressure at the retentate outlet 26 (and hence the unfiltered liquid portion of the filter unit 18) sufficiently exceeds the liquid pressure at the filtrate outlet 44.

The filter housing 20 (FIGS. 2 and 3) comprises a generally cylindrical peripheral wall 51. The housing peripheral wall 51 has an interior face 57. If desired, the housing peripheral wall 51 may be formed by coaxially welding together a top, flanged portion 52, an elongate central tubular portion 53, a downwardly narrowing, or bell, portion 54 and a bottom flange portion 55, all of generally annular construction. The bottom flange portion 55, at its bottom end, incorporates the radially outward extending retentate outlet flange 24. The top flange portion 52 at its upper end incorporates a radially outwardly extending top flange 60.

The filter unit 18 (FIGS. 2 and 4) includes a filtrate manifold 70 which coaxially overlies the housing top flange 60. The filtrate manifold 70 has a coaxial central throughbore 76. The filtrate manifold 70 comprises a radially extending, substantially disc-like central body 71 and coaxial central outboard and inboard bosses 72 and 73, respectively extending axially upward and downward (in FIG. 2) from the radially extended central body 71.

The filter housing 20 has an elongate central chamber 56 circumferentially surrounded by the housing peripheral wall 51. The inboard boss 73 is of outer diameter to fit snugly, but axially slidably, in the upper end of the elongate central chamber 56 of the filter housing 20.

Figure 2:
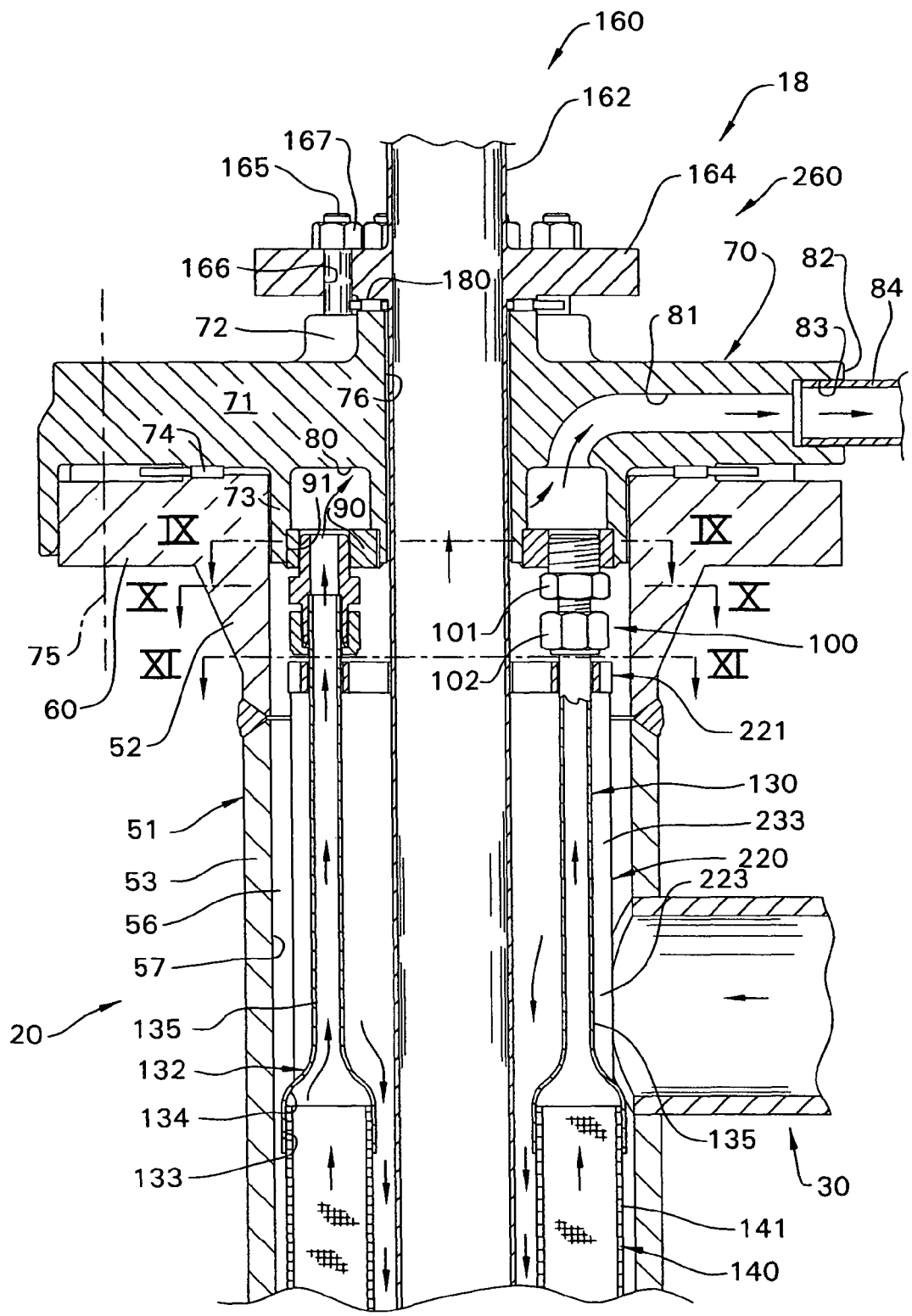
FIG. 2 is an enlarged fragmentary, central cross sectional view of the top portion of the FIG. 1 filter unit.

The filtrate manifold central body 71 is coaxially fixedly but releasably connected to the flange 60 of the filter housing, in any conventional manner, such as by a coaxial, circular array of circumferentially spaced nut/bolt fasteners (not shown), through the coaxial flange 60 and manifold body 71. The axis 75 of one such nut/bolt fastener is schematically indicated in FIG. 2 for purposes of illustration. Such firmly, axially and sealingly sandwiches an annular seal 74 between the flange 60 and manifold body 71.

A coaxial, annular channel 80, here substantially rectangular in cross section, opens downward from the central inboard boss 73 and is radially spaced between the interior face 57 of the housing peripheral wall 51 and the central bore 76 of the filtrate manifold 70.

A filtrate outlet passage 81 (FIG. 2) is substantially L-shaped in cross section. The passage 81 extends axially upward from communication with the annular channel 80 and then bends radially outward in the central body 71 to open through the peripheral wall 82 of the manifold central body 71. A recess 83 in the radially outer end of the outward passage 81 may snugly, fixedly, and sealingly receive the inboard end of a stub pipe 84 carrying the flange 42 (FIG. 1) and defining a portion of the filter liquid outlet port 44.

A plate-like ring 90 (FIG. 2) is coaxial with, and recessed in, the bottom portion of the annular recess 80 and is fixed therein by any convenient means such as welding. A circumferential array of holes 91 opens vertically through the ring 90, in radially spaced relation between the inner and outer edges of the ring 90. The holes 91 are preferably evenly circumferentially spaced around the ring 90. In the embodiment shown, the holes 91 are threaded.

Figure 4:
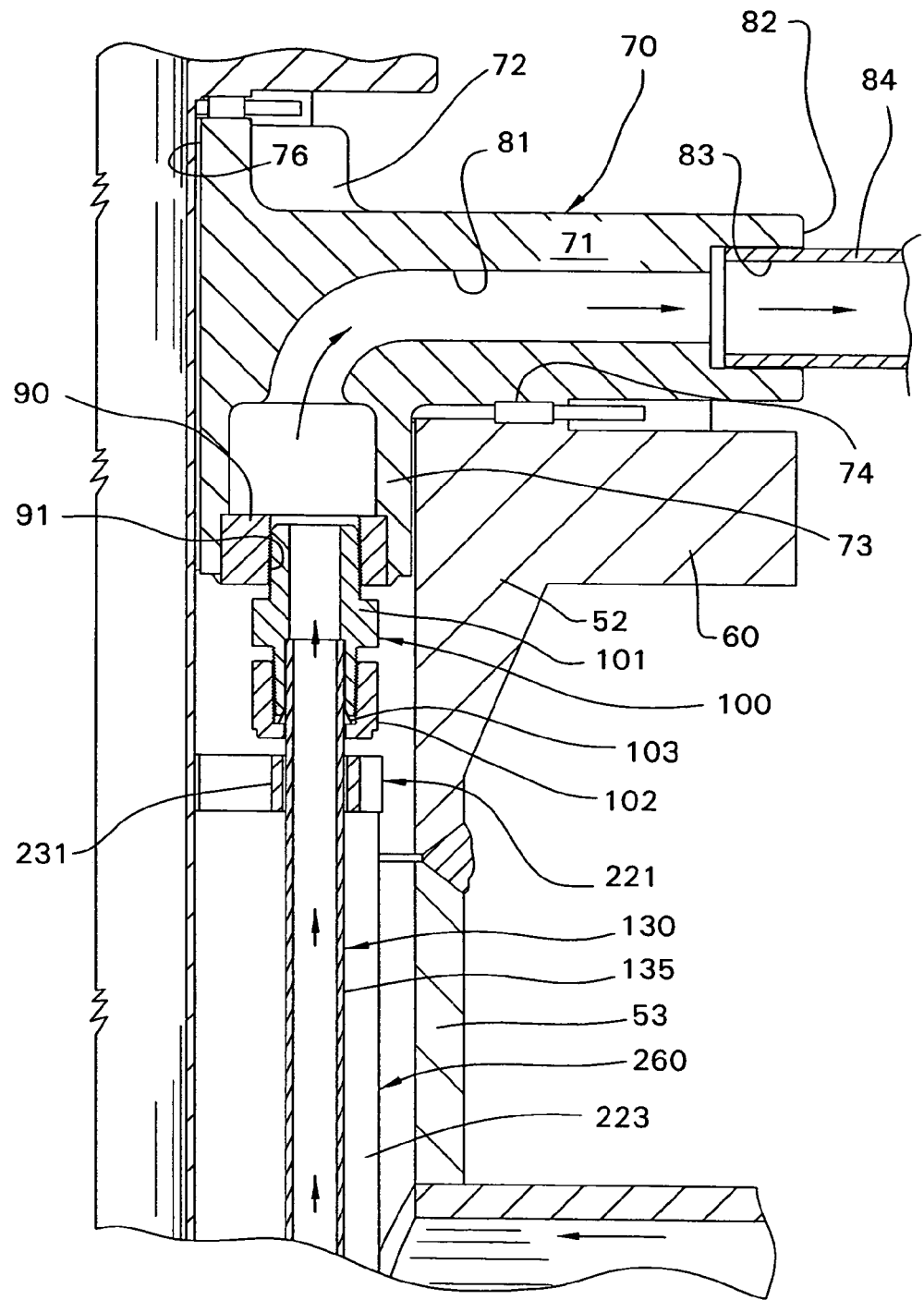
FIG. 4 is an enlarged fragment of FIG. 2.

An adapter fitting 100 (FIGS. 2, 4, 9 and 10) is coaxially, releasably, fixedly received in and depends from each of the holes 91 of the ring 90 so as to provide an array of circumferentially spaced adapter fittings 100. Such array, the ring 90, and the annular channel 80 are preferably coaxial with the housing peripheral wall 51 and are spaced inboard therefrom, as indicated in FIGS. 2 and 4.

Figure 5:
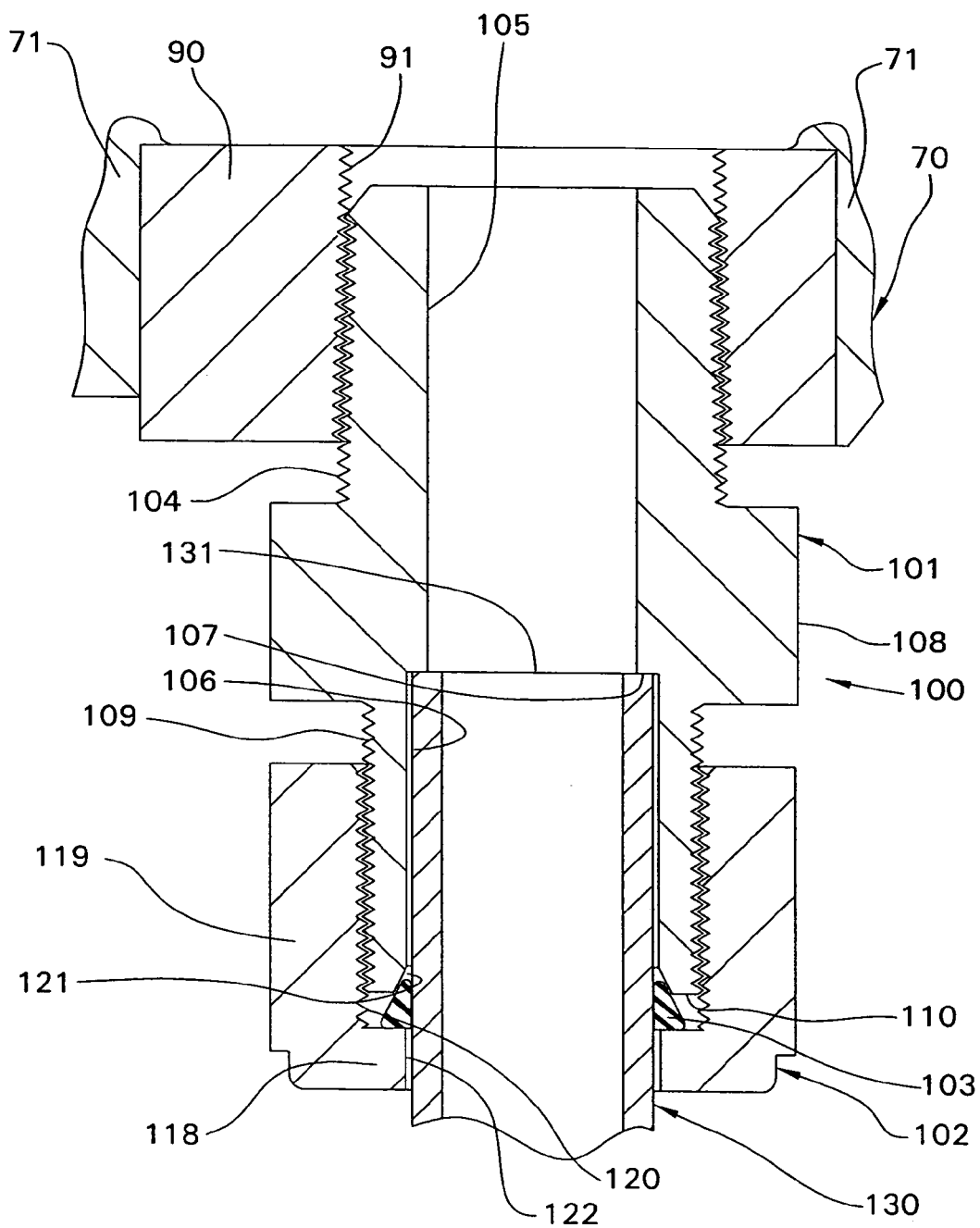
FIG. 5 is an enlarged fragment of FIG. 4.

In the embodiment shown, the adapter fittings 100 (FIG. 5) each comprise an upper, mounting sleeve 101, a lower, compression nut 102, and an axially interposed compressible ring 103.

The upper portion of the mounting sleeve 101 is externally threaded at 104 (FIG. 5) and threads into the internally threaded hole 91 in the ring 90. The mounting sleeve 101 has a coaxial throughbore 105, the lower portion of which is recessed at 106 so as to define a downward facing annular step 107. The mounting sleeve 101 has a generally cylindrical, reduced diameter, externally threaded, lower end portion 109 and an axial midportion 108 of external shape (e.g. hexagonal) engagable by a tool (e.g. wrench) for tightening or loosening the mounting sleeve 101 with respect to the ring 90.

Each compression nut 102 has a bottom wall 118 and an annular peripheral wall 119 upstanding from the bottom wall 118. The interior face of the peripheral wall 119 has a threaded upper portion 120 to thread onto the external threads 109 of the lower portion of the mounting sleeve 101. The lower portion 121 of the interior face of the recess 106 is preferably downwardly and outwardly tapered to the bottom end 110 of the mounting sleeve 101. The bottom wall 118 of the compression nut 102 has a coaxial bore 122 of diameter equal to or slightly larger than the recess 106 of the mounting sleeve 101.

For each adaptor fitting 100, a corresponding, elongate tubular element adapter 130 (FIGS. 2 and 5) has an upper portion loosely encircled by the nut 102 and snugly but slidably carrying the compression ring 103. Above the compression ring 103, the element adaptor 130 is snugly but slidably received in the recess 106 of the mounting sleeve 101. The top end 131 of the element adapter 130 abuts the downward facing step 107 at the top of the recess 106.

Upon threading the nut 102 upwardly on the mounting sleeve 101, the bottom wall 118 of the nut 102 axially compresses the compression ring 103 against the tapered portion 121 at the bottom end 110 of the mounting sleeve 101 and so expands radially the cross section of the compression ring 103 forcibly and sealingly between and against the tapered portion 121 of the mounting sleeve 101 and the outer peripheral surface of the element adapter 130. This fixedly and sealingly depends the element adapter 130 from the adapter fitting 100, and hence from the plate-like ring 90 and filtrate manifold 70.

To facilitate threaded tightening on the mounting sleeve 101, the nut 102 may be provided with a tool (e.g. wrench) engagable outer peripheral surface shape, e.g. a hexagonal shape as indicated at 123 in FIG. 2.

The adapter fitting 100 may be similar in broad principle to a domestic sink drain compression fitting. One suitable adapter fitting 100 is commercially available as P/N 810-1-8B7 Bore Thru Male Connector, ½ inch" Tube to ½ inch NPT Male, available from Swagelok Company of 29500 Solon Road, Solon, Ohio 44139 USA.

The element adapters 130 (FIG. 2) extend downward past the inlet port 30, and thus are located in the incoming flow impingement zone. Each element adapter 130 is generally funnel shaped, with a widened, generally bell shaped lower end portion 132. The lower end portion 132 preferably comprises an enlarged diameter, downward opening, cylindrical recess 133 joined by a generally bell shaped, diameter reducer passage 134 to the bottom of the reduced diameter, major length portion of the element adapter 130.

A plurality of elongate, preferably cylindrical, perforate filter elements 140 (FIG. 2) coaxially depend from corresponding ones of the element adapters 130. Thus, each recess 133 snugly fixedly receives the upper end portion of a coaxial filter element 140. The filter element 140 is fixed within the cylindrical recess 133 by any convenient means, such as welding. In the embodiment shown, the reducer passage 134 makes roughly a 3:1 reduction in diameter, from the outer diameter of the filter element 142 to the inside diameter of the major portion 135 of the element adapter 130. The peripheral wall of the reducer passage is preferably smoothly and sinuously curved in cross section, as seen in FIG. 2, to smoothly, and with minimum turbulence, channel filtered liquid from the interior of the filter element 140 upward through the element adapter 130 and into the annular channel 80 of the filtrate manifold 70. While dimensions may vary from unit to unit, in the particular unit shown in FIG. 2, the lower portion 132 of the element adapter comprises about 15-20% of the total length of the element adapter.

Figure 3:
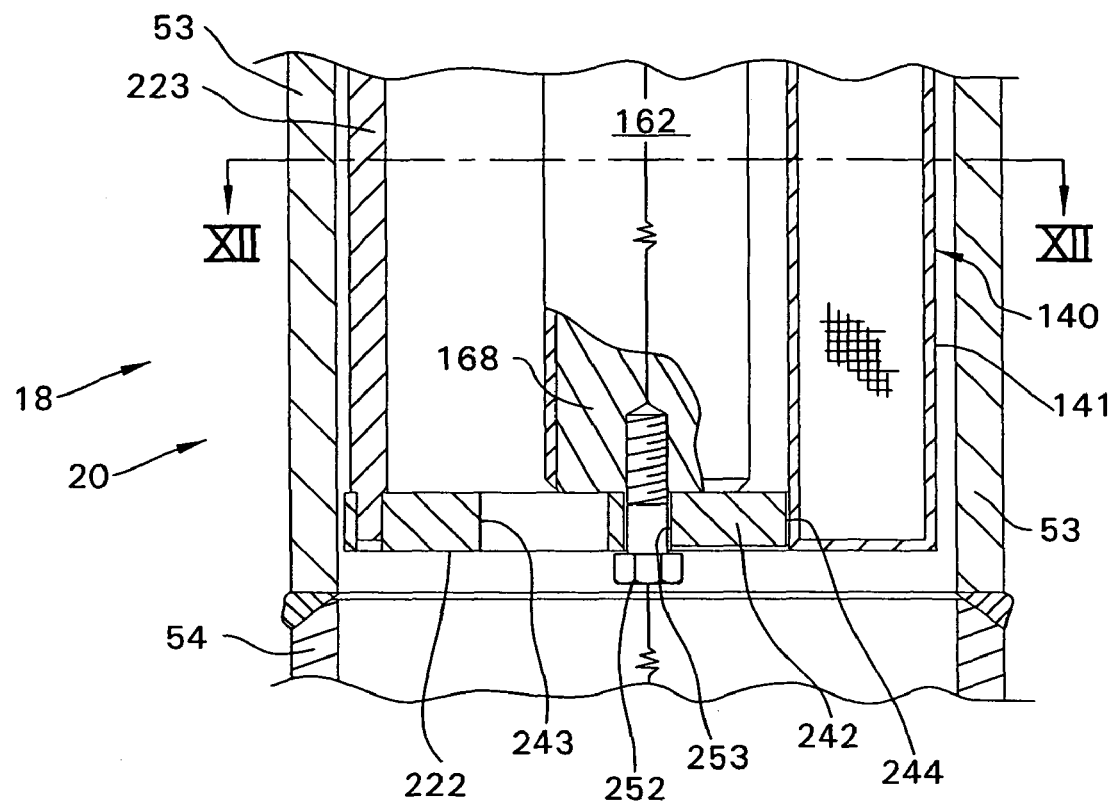
FIG. 3 is similar to FIG. 2 but of the bottom portion of the FIG. 1 filter unit.
Figure 3A:
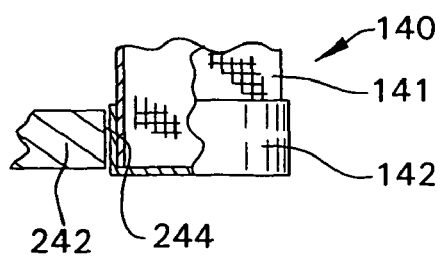
FIG. 3A is an enlarged fragment of FIG. 3.

The filter element 140 is, as shown in FIGS. 2 and 3, of relatively small diameter and relatively great axial length. For example, given a filter element 140 of one inch outside diameter, its length may be in the range of three to six feet. These slim elongate filter elements 140 are sometimes graphically referred to as "sticks". Typically, the filter element 140 comprises a cylinder 141 of metal mesh material with its bottom end portion (FIG. 3) snugly received in, closed by and stiffened by a cup-like closure 142 (FIG. 3A) fixed thereto, as by soldering in a conventional manner. The filter element 140 extends down to a location adjacent the bottom bell portion 54 of the filter housing 20. The filter element 140 is preferably of stainless steel, but other materials are contemplated.

In this way, an array of axially extending, circumferentially spaced element adapters 130 and filter elements 140 may depend from and communicate with the plate-like ring 90 and filtrate manifold 70.

In one unit constructed in accord with the invention, eight filter element/element adapter units 140/130 were provided in a single circumferential array generally coaxial with the filter housing 20. However, it is contemplated that such a circumferential array may contain more (or fewer) filter element/element adapter units 140/130. Moreover, it is contemplated that, by suitably expanding the diameter of the filter unit 18, two or more such circumferential arrays may depend in loosely telescoped, radially spaced, coaxial relation within the filter housing 20, and communicate through respective corresponding coaxial annular channels (not shown, but similar to and spaced outboard from the annular channel 80 of FIG. 2) with the filtrate outlet passage 81, so as to accommodate a substantially higher number (e.g. 100) of filter elements 140 in a single filter unit 18.

The filter unit 18 further includes an ultrasonic filtration/regeneration enhancer unit 160 (FIGS. 1 and 2). The enhancer unit 160 comprises an elongate cylindrical resonator tube 162 coaxially surmounted by an ultrasonic transducer 163. The transducer 163 is energized by a conventional ultrasonic power supply UPS (FIG. 1) to apply ultrasonic energy to the resonator tube 162. A mounting flange 164 (FIG. 2) extends radially from an intermediate portion of the resonator tube 162 for fixing the enhancer unit 160 with respect to the manifold 70. In the embodiment shown, a circumferential array of threaded studs 165 extend coaxially upwardly from the outboard boss 72 of the filtrate manifold 70 and passes through a corresponding circumferential array of holes 166 in the mounting flange 164. Nuts 167, threaded on the upper ends of the studs 165, are tightened to clamp the mounting flange 164 fixedly and coaxially atop the filtrate manifold 70. A conventional annular seal ring 180 is here axially clamped between the mounting flange 164 and filtrate manifold 70 to prevent liquid leakage radially outward therebetween.

The seal rings 74 and 180 here shown may be of a conventional kind having outer peripheral edges notched to fit around respective mounting bolts 75 or studs 165.

The resonator tube 162 (FIG. 2) extends coaxially downwardly, in a radial clearance manner through the central bore 76 of the filtrate manifold 70, and downward coaxially loosely within the circumferential array of element adapters 130 and filter elements 140. The bottom of the resonator tube 162 is closed by a resonator plug 168 (FIG. 3) of selected mass and fixed therein by any convenient means such as welding.

Units comprising generally similar resonator tubes and ultrasonic transducers have been used for a variety of purposes, but not, insofar as Applicants are aware, in pressure liquid filters, particularly of the type to which this invention is directed. More particularly, such units are available in various lengths for operation at a desired frequency in a predetermined range. Units of this general kind are available commercially from Telsonic Ultrasonics Inc. located at Bridgeport, N.J. with e.g. models MRG-20-1400 and RS-20-48-12F being available. In the embodiment shown, the transducer includes a piezoelectric driver coupled to the top of the resonator tube 162 to apply, at a selected ultrasonic frequency (e.g. 20 kHz), mechanical shock waves to the top of the resonator tube 162. The shock waves travel the length of the resonator tube 162 and reflect back up the tube from the resonator plug 168 at the far end of the resonator tube 162. As a result, the resonator tube axially extends and contracts, by a minute amount, at the applied ultrasonic frequency. That results in a corresponding minute contraction and expansion of the diameter, and circumference, of the resonator tube 162, generally in the manner of a rubber band or bungee cord, wherein lengthwise stretching reduces diameter/circumference and lengthwise contraction diameter/circumference.

The resonator plug 168 (FIG. 3) acts as a counterweight that is tuned to the frequency of the ultrasonic pulses applied to the resonator tube 162 by the transducer 163. Thus, tuning the transducer 163 and resonator tube 162 to the same desired frequency, and applying ultrasonic pulses from the transducer 163 to the resonator tube 162, may be said to cause the resonator tube 162 to ring like a bell (though inaudibly). The ultrasonic vibration of the resonator tube 162 is substantially uniform along its entire length and hence along substantially the entire length of the surrounding filter elements 140. Thus, the ultrasonic energy applied to the filter elements is substantially free of hot spots at one or more points along the length thereof.

Moreover, the cost of the inventive filter system is minimized at least in part by the requirement for only a single ultrasonic transducer to serve the entire filter housing and all of the filter elements therein. Moreover, the cost of the filter housing is kept low by avoiding any need for mounting plural ultrasonic transducers on the peripheral wall thereof.

Figure 6:
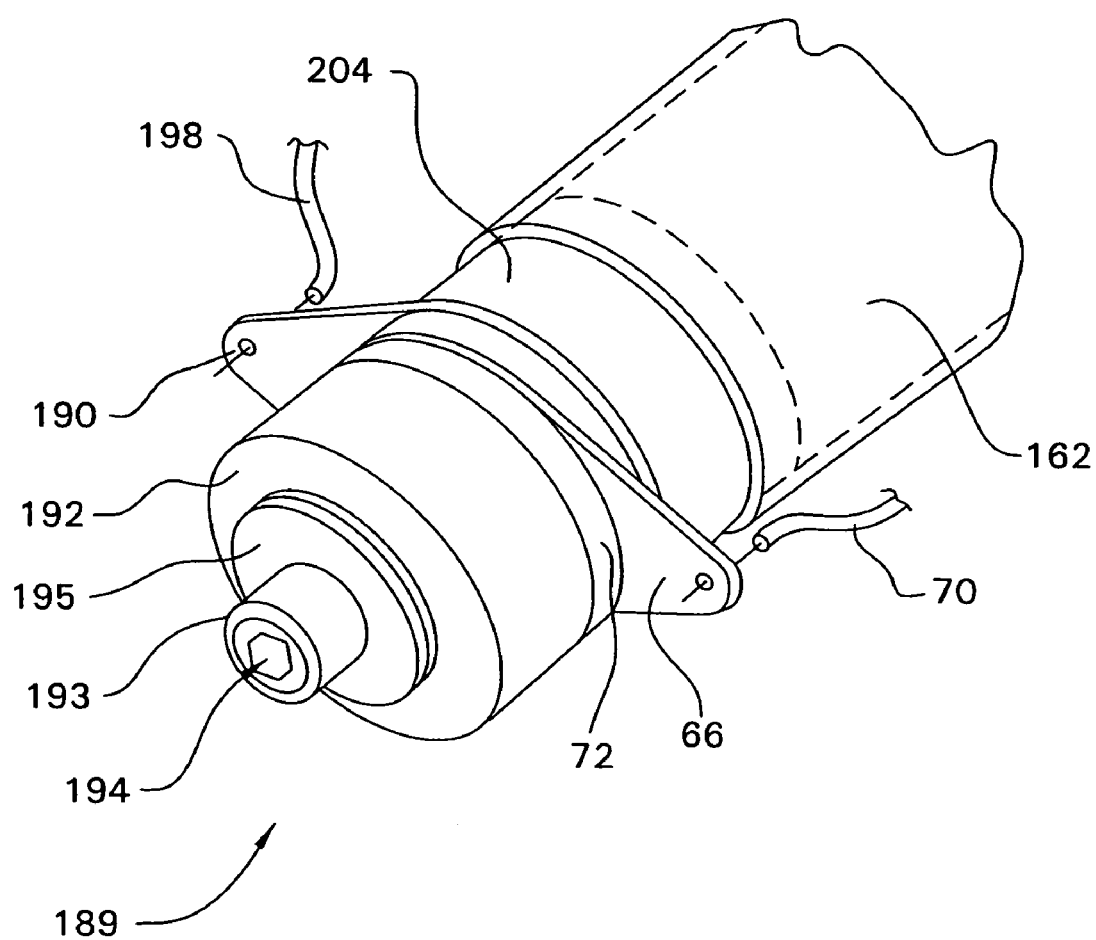
FIG. 6 is a schematic pictorial view of a conventional piezoelectric transducer core usable in the FIG. 1 apparatus.

FIG. 6 schematically shows a conventional ultrasonic transducer core 189, wherein a screw 194 threads into a central tapped hole (not shown) in the outboard portion of a cylindrical driver slug 204. The head 193 of the screw 194 presses an axial stack of annular elements 195, 192, 202, 196, 198 and 190 against the driver slug 204. In the embodiment shown, the stack comprises, in sequence, washers 195, a massive annular back slug 192, an annular ceramic insulator 202, an annular conductive terminal plate 196, an annular piezoelectric disk 197, and a further annular conductive terminal plate 190. The center holes in the piezoelectric disk 197 and outboard terminal plate 196 are larger in diameter than the shank of the screw 194 to prevent electrical contact of the screw 194 with the piezoelectric disk and terminal plate 196. Insulated electrical conductors 199 and 200 connect the transducer core 198 to the ultrasonic power supply UPS in FIG. 1.

It will be recognized that, given a transducer 163 having a core generally like that in FIG. 6, the driver slug 201 may be coaxially aligned with (and e.g. partially extend into) the upper end of the resonator tube 162 and be fixed therein by any convenient means. Also, the size of parts, for example the mass of the back slug 192, would be selected to correspond to the desired resonant frequency of vibration of the resonator tube 162 and ultrasonic power supply UPS.

Advantageously, the present invention locates the ultrasonic transducer 163 outside, and indeed in spaced relation to, the filter housing. Thus, a hot feed-liquid moving through the filter housing does not tend to heat up the transducer 163. This is advantageous because heat applied to a piezoelectric element in an ultrasonic transducer tends to cause same to lose efficiency (produce less ultrasonic output for the same electrical input). Indeed, a transducer 163 spaced from the filter housing, could, if desired, easily be wrapped in cooling jacket or the like.

While the elongate resonator member 162 is here provided in the form of a tube, it is contemplated that other forms (e./g. a solid bar) of elongate resonator member might be employed.

Figure 8:
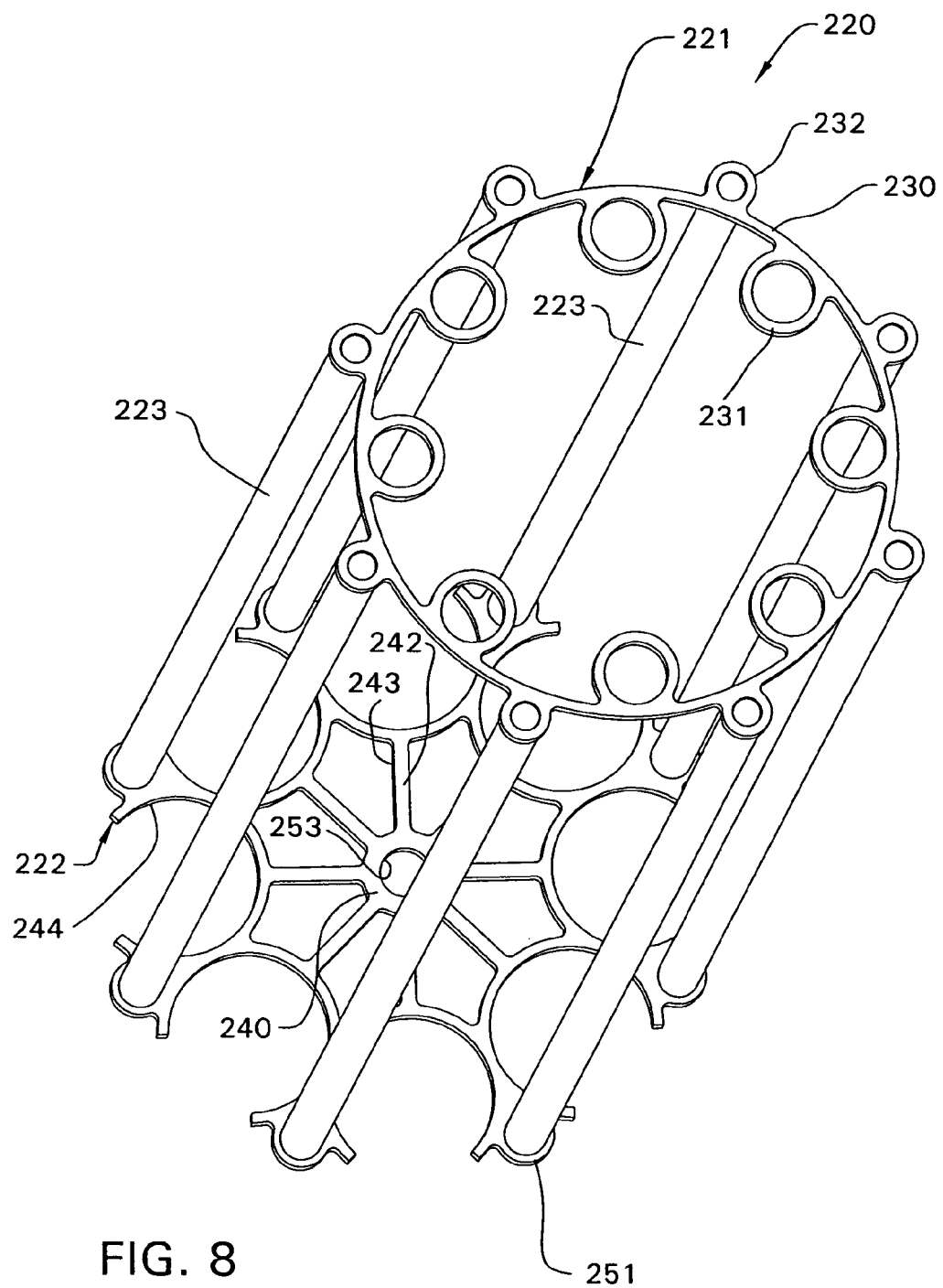
FIG. 8 is a pictorial view of the cage shown in fragmentary form in FIG. 2.
Figure 9:
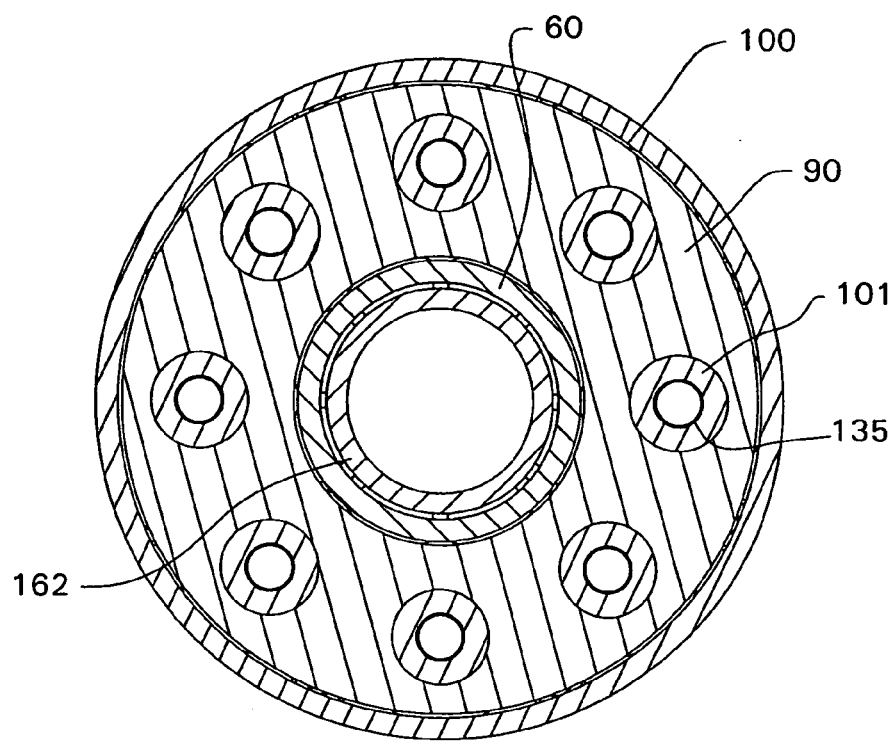
FIG. 9 is an enlarged sectional view substantially taken on the line IX-IX of FIG. 2.
Figure 10:
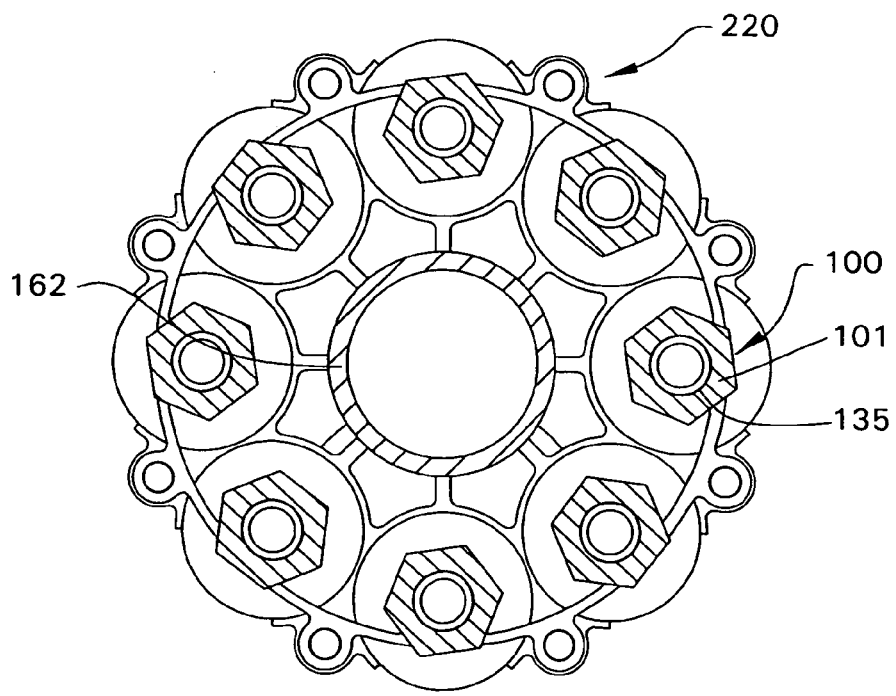
FIG. 10 is an enlarged sectional view substantially taken on the line X-X of FIG. 2.

Preferably, structure is provided to prevent the bottoms of the filter elements 140 and resonator tube 162 from moving laterally with respect to each other and to the fitter housing 20, to protect the filter elements from possible damaging contact with the upper end portion of the housing 20 during installation or removal of the filter elements 140 and resonator tube 162 with respect to the housing 20, and to maintain the filter elements 140 and resonator tube 162 in generally fixed relative relation for movement as a unit to a location outside the filter housing 20. Such structure would also prevent contact between resonator tube 162 and filter elements 140 that could cause variation in the ultrasonic system frequency and power output. In the preferred embodiment shown, such structure conveniently takes the form of a cage 220 (FIG. 8) comprising an upper hoop 221, and a lower spider 222 axially spaced therefrom and connected thereto by axially extending, circumferentially spaced guard members 223. In essence, the cage 220 surrounds and extends along the filter elements 140 and resonator tube 162. The hoop 221 and spider 222 here are conveniently each cut from plate stock, but may otherwise be formed as desired.

The hoop 221 (FIGS. 2 and 8) is axially located between the adapter fittings 100 and feed liquid port 30 and the spider 222 (FIG. 3) is preferably located at the bottom of the filter elements 140 and resonator tube 162.

Figure 11:
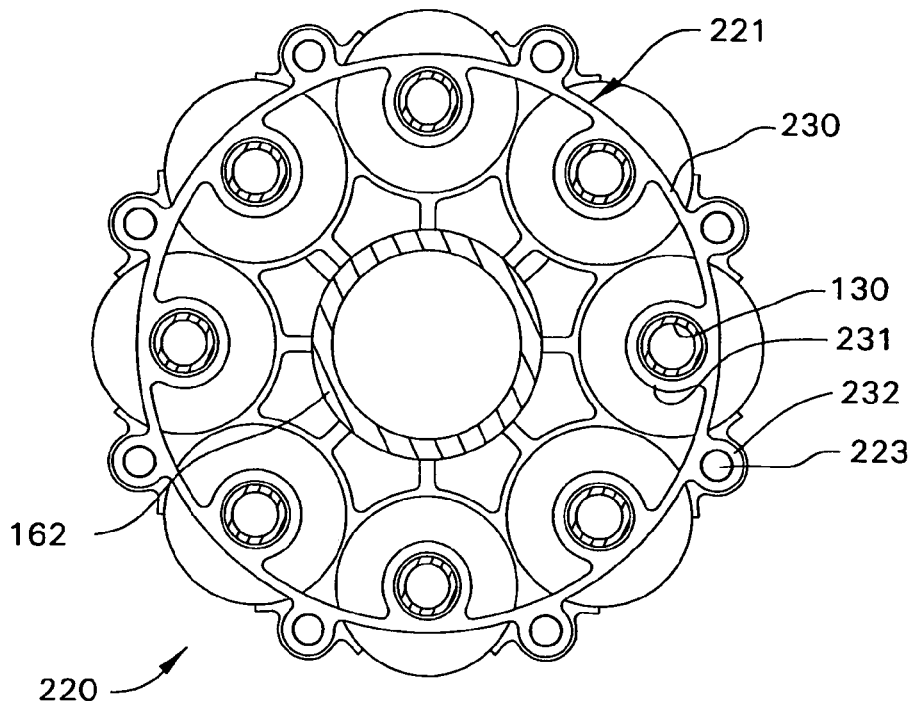
FIG. 11 is an enlarged sectional view substantially taken on the line XI-XI of FIG. 2.

The hoop 221 (FIGS. 8 and 11) here comprises a generally ring shaped body 230 from which radially inwardly protrude evenly circumferentially spaced adapter receiving loops 231 and radially outwardly protrude guard member receiving loops 232. Each adapter receiving loop 231 has an axial throughhole which snugly but slidably receives axially therethrough a corresponding one of the element adapters 130. The guard member receiving loops 232 each have an axial throughhole which fixedly (as by welding) receives the upper end of the corresponding guard member 223.

Figure 12:
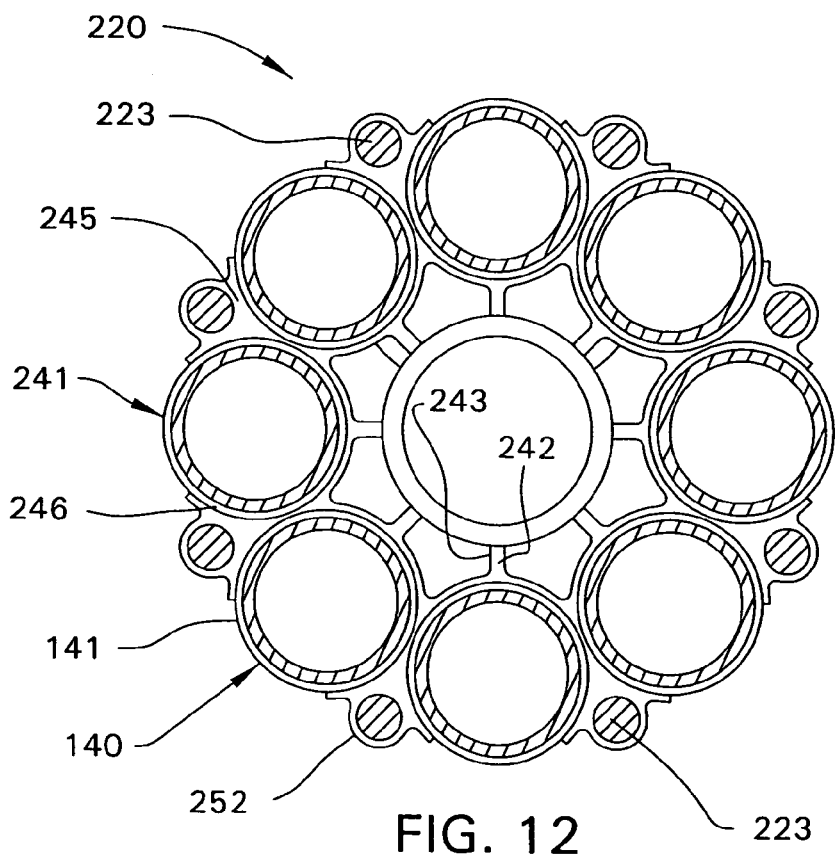
FIG. 12 is an enlarged sectional view substantially taken on the line XII-XII of FIG. 3.

The spider 222 (FIGS. 8 and 12) comprises a disk-like hub 240, a rim 241 and circumferentially spaced spokes 242 extending radially outward from the hub 240 fixedly to the rim 241 to fix the rim in coaxial surrounding relation with the hub. Axial flow openings 243 extend through the spider 222. The flow openings 243 are radially bounded by the hub 240 and rim 241 and circumferentially bounded by adjacent ones of the spokes 242.

The rim 241 includes closely circumferentially spaced, axial openings 244. In the embodiment shown, the rim 241 somewhat less than fully encloses the openings 244, so that the openings 244 are formed as radially outward opening, undercut recesses. The openings 244 snugly, but axially removably, receive the corresponding closed bottom portions, here defined by the cup-like closures 142, of corresponding filter elements 140. The rim 241 further includes radially outwardly protruding, guard member receiving, loops 251 which are evenly spaced circumferentially between the openings 244. The loops 251 have axial throughholes fixedly (as by welding) receiving the lower end portions of corresponding ones of the guard members 232.

The hub 240 has an upward facing surface for abutting the slug 168 at the lower end of the resonator tube 162 (FIG. 3). A screw 252 extends upward through a central hole 253 in the hub 240 and threadedly engages the resonator plug 168, to releasably fixedly coaxially secure the bottom of the resonator tube 162 atop the hub 240 of the spider 222.

Thus, the cage 220 is fixed by the screw 253 through the hub 242 to the resonator plug 168 at the bottom of the resonator tube 162, the cup-like, bottom portions of the filter elements 140 seat in the openings 244 of the spider 222, the spider fixedly connects via the upstanding, rod-like guard members 223 to the hoop 221 whose radially inboard loops 231 receive the element adapters 130 upwardly therethrough.

The outboard loops 232 and 251 extend radially outwardly beyond the filter elements 140, such that the loops 232 and 251 and the rod-like guard members 232 lie radially outboard of the filter elements 140 and thus provide a cage of protection around such filter elements. The spider openings 244 and inboard hoop loops 231 laterally locate the filter elements 140 and their element adapters 130 in substantially fixed relation. The guard members 223 in the embodiment shown, are elongate rods, stepped adjacent their ends to axially abut the hoop 221 and spider 222, with reduced diameter end portions extending through the loops 232 and 251.

Thus, the manifold 70, and ultrasonic unit 160, adapter fittings 100, element adapters 130, filter elements 140, and cage 220 form a cartridge 260 insertable or removable, as a unit, with respect to said housing 20 and movable as a unit outside the housing 20 from a convenient place of assembly, or to a convenient place for disassembly.

The above discussed structure is preferably corrosion resistant, and is conveniently formed substantially of stainless steel, although the seals 74 and 180 may be of a suitable resilient material. However, the materials employed may vary depending on the intended application.

To assemble the unit 18 (FIGS. 2 and 3), the mounting sleeves 101 of the adapter fittings 100 are threaded into the holes 91 in the plate-like ring 90 fixed to the manifold 70. The upper end portions of the element adapters 130 (with their filter elements 140 coaxially attached) are inserted through the corresponding loops 231 in the hoop 221 and the cup-like, bottom closures 142 of the filter elements 140 are dropped into their openings 244 (FIGS. 8 and 12) of the assembled cage 220. The compression nuts 102 and compressible rings 103 are slid over the tops of the corresponding element adapters 130. The upper end of each element adapter 130 is then slid into the corresponding recess 106 (FIG. 6) of its corresponding adapter mounting sleeve 101. Nut 102 is threaded onto such mounting sleeve 101 and tightened to fix the element adapter 130, and thus its depending filter element 140, to the filtrate manifold 70.

The resonator tube 162 of the assembled enhancer unit 160 is then inserted coaxially through the seal ring 180 and the central bore 76 of the filtrate manifold 70 and the array of element adapters 130 and filter elements 140, until the mounting flange 164 drops over the studs 165 and onto the annular seal 180, and the resonator plug 168 bottoms on the cage hub 240, to which it is then fixed by the screw 252. The mounting flange 164 is then fixedly pressed against the seal 180 by the nuts 167. The parts thus assembled form a self supporting cartridge 260. The annular seal 74 is then coaxially placed atop the housing top flange 60 and the cartridge 260 is lowered coaxially into the filter housing 20. With the central body 71 of the filtrate manifold 70 resting on the seal 74 on the housing top flange 60, same are then fixed sealingly and coaxially together, as by conventional nut/bolt units (the center line of one of which is indicated at 75 in FIG. 2).

Installation of thus assembled filter unit 18 is then completed by making its connections to the liquid and electrical circuitry above discussed with respect to FIG. 1.

Reversal of the above sequence allows, e.g. should it be desired after a period of use, quick and easy removal of the cartridge 260 (including the cage 220, filtrate manifold 70, filter elements 140, element adapters 130, adapter fittings 100, and the entire ultrasonic enhancer unit 160 from the filter housing 20. After such removal it is a simple manner to disassemble the cartridge 260, e.g. to inspect and/or repair or replace parts thereof.

Operation

With the filter unit 18 connected as shown in FIG. 1, unfiltered process liquid (feed liquid) is pumped from the tank TK through pump PU, strainer ST, inlet valve IV and into the inlet port 30. The feed liquid radially enters the filter housing 20 and impinges on the slim, intermediate portions of the element adapters 130 (FIG. 2). Thus, radially inwardly directed feed flow is spaced above the filter elements 140, such that no part of the perforate wall of the filter elements 140 is hit by radially directed, incoming, feed flow. This avoids immediate blinding or damage to the upper portion of the adjacent filter elements 140, and avoids differences in filtering characteristics along the length of the filter elements 140.

The incoming feed liquid flow from the inlet port 30, as indicated by the arrows in FIG. 2, turns and flows downwardly along the element adapters 130, smoothly past the substantially bell shaped lower end portions thereof and thence down along, and parallel to the filtering face of each of the elongate filter elements 140. The feed liquid flow continues downwardly past the bottom of the filter elements 140 (FIG. 3) and then out through the bell portion 54 and flange portion 55 of the filter housing 20. Filtration is of crossflow, not barrier, type.

Thus a major, unfiltered portion of the feed liquid (termed the retentate) flows from the bottom of the filter housing 20, through the retentate outlet valve ROV (FIG. 1) and flow control FC2, and back into the tank TK.

As hereafter discussed, the remaining portion of the feed liquid, incoming through the inlet port 30, passes through the walls of the filter elements 140 (FIG. 2) and (as filtrate) passes in the direction of the upwardly directed arrows through the open upper ends of the filter elements 140, the tubular element adapters 130, the fittings 100, the annular channel 80 of the filtrate manifold 70, and then laterally outward through the filter outlet passage 81 and the stub pipe 84 of the filtrate liquid outlet port 44. Such filtrate liquid then passes through the filtrate outlet valve FOV and flow control FC3 to any desired filtrate user FUA.

During such crossflow filtration, typically 5 to 10% of the incoming feed liquid entering the inlet port 30 emerges from the filtrate outlet port 44 as filtrate usable by the filtrate user FUA. For example, in an oil refinery the feed liquid may be relatively low grade oil contaminated with relatively large impurity elements and which thus has limited, relatively low value usage. On the other hand, the filtrate is stripped of such relatively large impurity elements and thus is a cleaner oil, substantially improved in its value, for example by anywhere from a dollar or two per barrel to multiple dollars per barrel, depending on the particular filtrate user FUA involved. For example, filtrate suitable to be processed into gasoline may experience a substantial (e.g. $30 per barrel) improvement in value. Thus, flowing 5,000 gallons of feed liquid per hour through the filter housing 20, to yield 100 gallons per hour of filtrate, worth $2/barrel more than the incoming feed liquid, is a commercially desirable achievement.

If the filter unit 18 cleans, and outputs as filtrate, 5-10% of the incoming feed liquid, then clearly the unfiltered portion of the feed liquid (the retentate), emerging from the bottom of the filter unit 18 and returned to the tank TK, has an increased concentration of relatively large contaminate elements. However, such retentate may be usable by certain process feed users FEU. Indeed, for some feed liquids, it may actually be advantageous to build up the concentration of the larger impurity elements in the retentate. For example, in the oil refinery business those larger impurity elements, in sufficient concentration, are themselves a saleable product (as in asphalt for road building). Thus, a filter system embodying the invention can efficiently contribute to the production of two saleable products, one from the retentate and the other from the filtrate.

Attempts to pass, by barrier mode filtration, all incoming feed liquid of the mentioned difficult, high solids kind through a filter element, to separate the large impurities therefrom, have tended to unacceptably quickly (almost instantaneously for some feed liquids) blind the filtration element and terminate filtration in a commercially unacceptable manner. The present invention solves the problem of providing commercially acceptable filtration of such difficult feed liquids by combination of crossflow filtration and ultrasonic enhancement of filtration and regeneration.

Under the present invention, crossflow filtering continuously routes incoming feed liquid along the length of the filter elements. The continuous flow of feed liquid over the inlet face of each filter element tends to wash away accumulating solids, such that a modest percentage of the feed flow, stripped of impurities larger than the pores of the filter wall, continuously emerges from the filter unit, as filtrate, for a longer period of time before blinding of the filter element wall occurs and filtrate production stops.

Figure 7A:
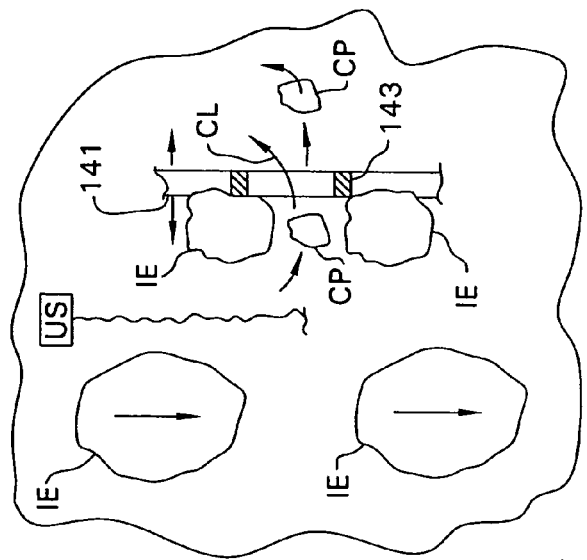
FIGS. 7A, B, C and D schematically illustrate interactions, under differing conditions, of solids in the feed liquid with holes/gaps in a filter element wall.

As schematically seen in FIG. 7A, it is desirable in crossflow filtration that the carrier liquid CL, with relatively large impurity elements IE to be filtered out, flow along the input side of the perforate filter element wall 141, while a portion of the carrier liquid CL, together with relatively smaller entrained solids particles CP, i.e. smaller than the filter element pores 143, passes through the pores 143 in the filter element wall 141, as filtrate.

Figure 7B:
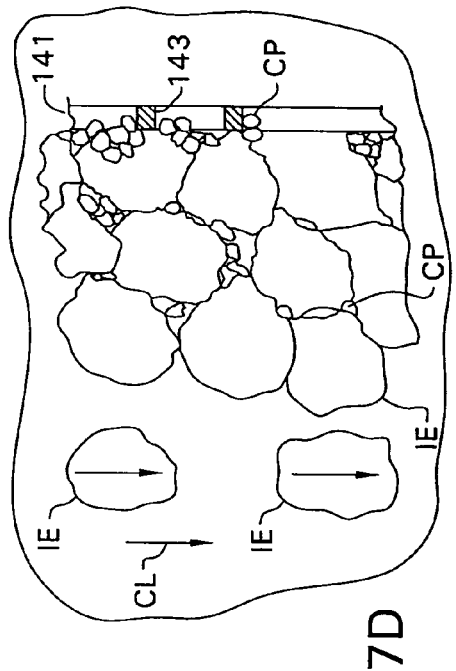

Over time, as indicated in FIG. 7B, a porous cake of larger impurity elements IE may build up on the filter element wall 141. However, the porosity of the relatively thin layer of cake in FIG. 7B still allows solids particles CP smaller than the filter wall pores 143, together with a portion of the carrier liquid CL, to pass through the filter wall 141 as filtrate. To allow formation of a desired thickness of porous cake on the inlet surface of the filter elements 140, the filter elements preferably are spaced from each other by something more than twice the desired cake thickness. In one unit constructed according to the invention, wherein a 3/16 inch cake thickness was found desirable, the spacing of the inlet faces of adjacent filter elements 140 exceeded twice that (3/8 inch) and was approximately 1/2 inch, although it is contemplated that these distances may vary depending on the desired cake thickness for the particular application in which the filter unit is to be used. On the other hand, since cake does not form on the resonator tube 162, the adjacent inlet surfaces of the filter elements 140 are preferably closer to the resonator tube than to each other. The object is that a given filter element be spaced from adjacent filter elements and from the resonator tube (1) distantly enough to allow formation of the desired thickness of cake on the filter elements, without contact by cake on one filter element with either cake on an adjacent filter element or with the resonator tube 162, but (2) closely enough that all feed liquid flowing through the filter housing moves rapidly and closely along the inlet faces of the filter elements to enhance its cake limiting cleaning effect on the filter elements. The foregoing spacing from the resonator tube 162 of course applies to the inner circle of filter elements, that immediately surround the resonator tube 162, since filter elements of surrounding circles (if any) are disposed outside that inner circle and remote from the resonator tube 162. Eventually, filter cake may further build up on the input side of the filter wall 141 sufficient to slow filtrate production and thereby require regeneration of the filter unit, but for commercial acceptance regeneration should be needed infrequently and be brief.

Figure 7C:
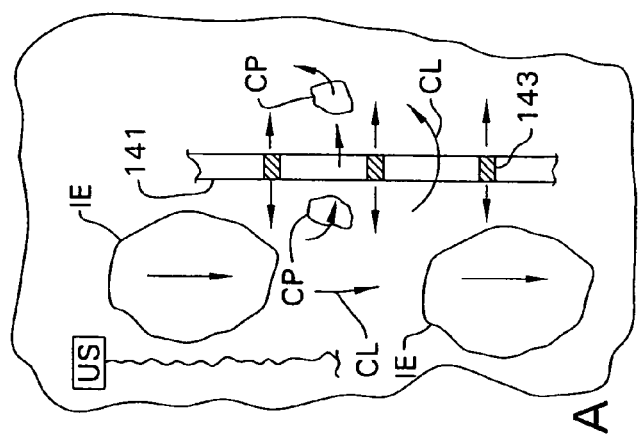
Figure 7D:
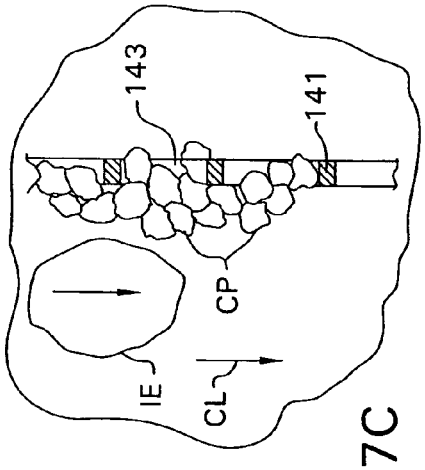

However, in certain difficult, high solids liquids, the small particles CP, intended to pass through the filter element wall 141, are of a type which readily stick together, or coalesce, and so tend to quickly adhere together on the input side of the filter wall 141 and blind the pores 143 therein, as schematically shown in FIG. 7C. Indeed, such sticky, coalescing, small particles CP may quickly bind together larger impurity elements IE and so quickly form a cake impenetrable by the carrier liquid and desirable small particles CP, on the input side of the filter wall 141 as schematically shown in FIG. 7D, such that the filter element becomes inoperative and filtration ceases.

Applicants have found that, even in crossflow filtration, the presence of such sticky, coalescing particles CP may blind the filter more quickly than is commercially acceptable. However, Applicants have found that the energization of the transducer 163 of the ultrasonic enhancer 160 (FIG. 1), and the resulting (at ultrasonic frequency) radial expansion and contraction of the resonator tube 162 along its length, in the feed liquid surrounding the filter elements 140, disrupts an impenetrable (as in FIGS. 7C and 7D) build up of cake on the input side of the filter wall 141, so that any cake that may build up remains relatively thin and porous (as in FIG. 7B) and a blinding, impenetrable build up of cake schematically shown (as in FIGS. 7C and 7D is avoided at least for a substantially longer, commercially acceptable time. It is believed that the ultrasonic agitation of the feed liquid by the energized resonator tube 162 may limit undesirable, impenetrable cake build up, at least in part by preventing bridging (as schematically shown in FIG. 7C) of the pores 143 in the filter element wall 141 by the small, sticky, coalescing particles CP.

Thus, filter cake on the input face of the filter elements 140 is, under the present invention, continually attacked by two mechanisms, namely (1) the washing effect of the feed liquid crossflow along the filter element wall and (2) the dispersive effect caused by a continuous ultrasonic cavitation.

Ultrasonic energy, in the present invention, has two beneficial effects: (1) the disruption of solids caked on the filter element wall so that they may be more easily washed away by the crossflow current of the feed liquid and (2) the disruption of small coalescing particles bridging the holes in the filter element wall which allows these particles to pass through the filter element wall, rather than being trapped in the filter cake. The net effect is to delay an eventual rise of differential pressure across the cake and filter element wall, due to filter cake growing and becoming non-porous.

Thus, the combination of crossflow filter operation and ultrasonic energization of the elongate resonator tube 162 along the length of the filter elements 140 has been found by Applicants to allow continuous filtration operation indefinitely, or at least for a much longer, commercially acceptable, period of time, before output of filtrate is impeded.

Given a sufficient build up of filter cake on the input side of the filter elements 140, pressure sensors PS1 and PS2 (FIG. 1) sense a difference in pressure sufficient to cause the differential pressure responsive control DP to close the filtrate outlet valve. Thus, filtrate outflow of the filtrate outlet 44 stops and the pressure differential across the filter element walls 141 (the pressure differential between the pressure sensors PS1 and PS2) disappears. Thus, the liquid pressure holding the cake against the input side of the filter wall 141 disappears, such that there is nothing (except for the relatively minor cohesive force of the sticky, cohesive, small particles CP) to hold the filter cake to the inlet side of the filter element wall 141. Thus, the agitation of the feed liquid by the energized resonator tube 162 helps to break up the filter cake, while the continuing flow of feed liquid washes away dislodged portions of the cake out the retentate outlet 26 and so back to the tank TK. This regenerates the filter elements 140 to their original clean state.

This regeneration, under the present invention, is short in duration and may be in the range of seconds e.g. 30 seconds. The differential pressure responsive control DP is conveniently set to reopen the filtrate outlet valve FOV after a preselected, sufficient regeneration time to restore normal filtering operation and output of filtrate to the filtrate user FUA. The differential pressure responsive control DP is conveniently of conventional type, and indeed of the type used commercially for a number of years in controlling regeneration in prior production filter systems of the Assignee of the present invention. An example is disclosed in U.S. Pat. No. 5,792,373 assigned to the Assignee of the present invention.

Over the duration of the regeneration cycle, the feed flow through the filter housing and the application of ultrasonic energy are both continued. In view of the closed filtrate outlet valve FOV and resulting absence of differential pressure holding filter cake to the inlet wall of the filter element, the cake is readily washed from the inlet face of the filter element. Since the filter element is a single layer surface-retention element, the level of solids on the filter element input face is kept low, as there is no depth filter media to entrap such solids.

The inventive system herein disclosed, has been found in testing to provide at least a 100% improvement in filtration performance over corresponding prior barrier filtration technology. As one advantage, this allows a filtration system according to the present invention to be sized much more economically, and still achieve the same performance as in prior systems.

Indeed, it appears that systems according to the present invention might provide as much as 2½ times the performance of a comparable barrier filtration system, i.e. 2½ times the gallons of filtrate produced per square foot of surface area of filter element per unit time. The standard of comparison in a barrier mode filter is the REACTOGARD® filtration system which has been marketed for several years by, and is covered by aforementioned U.S. Pat. No. 5,792,373 of the Assignee of the present invention.

The performance of the filtration system according to the present invention is further enhanced by provision of the flow control FC3 in the filtrate outlet line from the filtrate outlet 44 to the filtrate user. FUA. The flow control FC3 allows careful control of the filtrate outflow rate. By limiting the rate of filtrate outflow with the flow control FC3, the formation of cake on the inlet side of the filter element wall 141 is slowed, and it is believed that any cake being formed is less dense and thus less inhibits flow through the filter element wall. Absent the flow control FC3, the filtrate flow rate essentially self-regulates by building cake on the filter element wall, which may result in premature blinding of the filter element. More particularly, the constant filtrate draw rate maintained by the filtrate flow control FC3 prevents the perforate wall of the filter element from immediately blinding by a rush of feed through the clean filter element perforate wall.

The ability of the present invention to maintain long periods of filtration, with at most brief, infrequent regeneration times, clearly avoids the need to shut off process liquid (feed) flow through the filter housing 20 for filter element cleaning. It also avoids the need to disassemble the filter unit for withdrawal, external cleaning, and replacement of filter elements on a regular basis, which would cause substantial economic losses in process downtime and extra labor costs.

Additionally, the present invention avoids the need for backwashing of filter elements and so eliminates considerable expense. In particular, providing a backwash supply is expensive, either because of use for backwashing of liquid that has already been filtered or the need to provide a different backwash liquid. Additional expense results from the need for additional tanks and pumps and a destination for dirty backwash liquid.

While one unit according to the invention employed ultrasonic energy at 20 kiloHertz (kHz) frequency, differing frequencies are contemplated which for example might include frequencies up to and beyond 30 kHz.

Also, in one unit according to the invention, about 1,000 watts of ultrasonic energy was applied to the ultrasonic enhancer unit 163, although power levels in the range 500 to 2000 watts are contemplated.

Applicants have found it desirable, in accord with the invention, to minimize the space laterally around the resonator tube 162 and filter elements 140, so as to maximize the velocity of feed liquid lengthwise of the input face of the filter elements 140, to help wash away filter cake from the input face of the filter elements.

In accord with the invention, the pores 143 in the walls of the filter elements 140 are sized in the so-called microfiltration range which includes pore sizes down to about 0.5 micron. In contrast, prior crossflow filtration has conventionally been, insofar as Applicants are aware, (1) used in the so-called ultrafiltration range and below, in which filter membrane pores are sized an order, or more, of magnitude smaller than 0.5 micron, and (2) not used on liquids of the kind of interest here.

Moreover, prior conventional thinking appears to have been that microfiltration could be satisfactorily conducted using existing barrier mode type filters. However, Applicant has found that, with some difficult, high solids liquids having particularly gummy, sticky, coalescing solids particles to be maintained in the filtrate, it is difficult to obtain commercially acceptably long periods of uninterrupted filtration using barrier filtration technology.

Several advantageous features of the present invention are summarized as follows.

The present invention is applicable to multiple filter housings, each containing at least 8 to 100 high-aspect ratio (high length to diameter ratio), elongate (e.g. 30 to 72 inches long) filter elements. Fine retention (e.g. 10 micron and smaller), single layer mesh filter elements, which can be classified as true "surface retention" filter elements, are preferably employed. The inventive filter system is operated as a crossflow filter, with a minority percentage of the total feed being filtered and drawn off as filtrate, while a majority percentage of the feed flows along the inlet face of the filter element wall and assists in the removal therefrom of captured solids (i.e. the filter cake). While in crossflow filtration mode, ultrasonic energization assists in maintaining porous any filter cake being formed. While in regeneration mode, ultrasonic energization aids in the removal of the filter cake once it has grown to the critical cake thickness (as measured by differential pressure). The flow control FC3 utilizes feedback control to maintain constant filtrate flow rate from the filter housing. The system is particularly useful in handling feed having high solids loading (in excess of 1500 parts per million (PPM)) by weight (and perhaps a multiple of that) with particle size distribution typically less than 30 micron diameter but with significant concentrations of particulate (at least 10% by mass/volume) finer than the rated media retention (hole size in the filter element wall). The filter elements are regenerated in-situ the filter housing by combination of the washing effects of the crossflow feed stream and ultrasonic dispersion from the integrated ultrasonic transducer. The regeneration cycle is controlled by closing the filtrate outlet (isolation) valve FOV over the duration required for regenerating the filter elements.

Figure 1A:
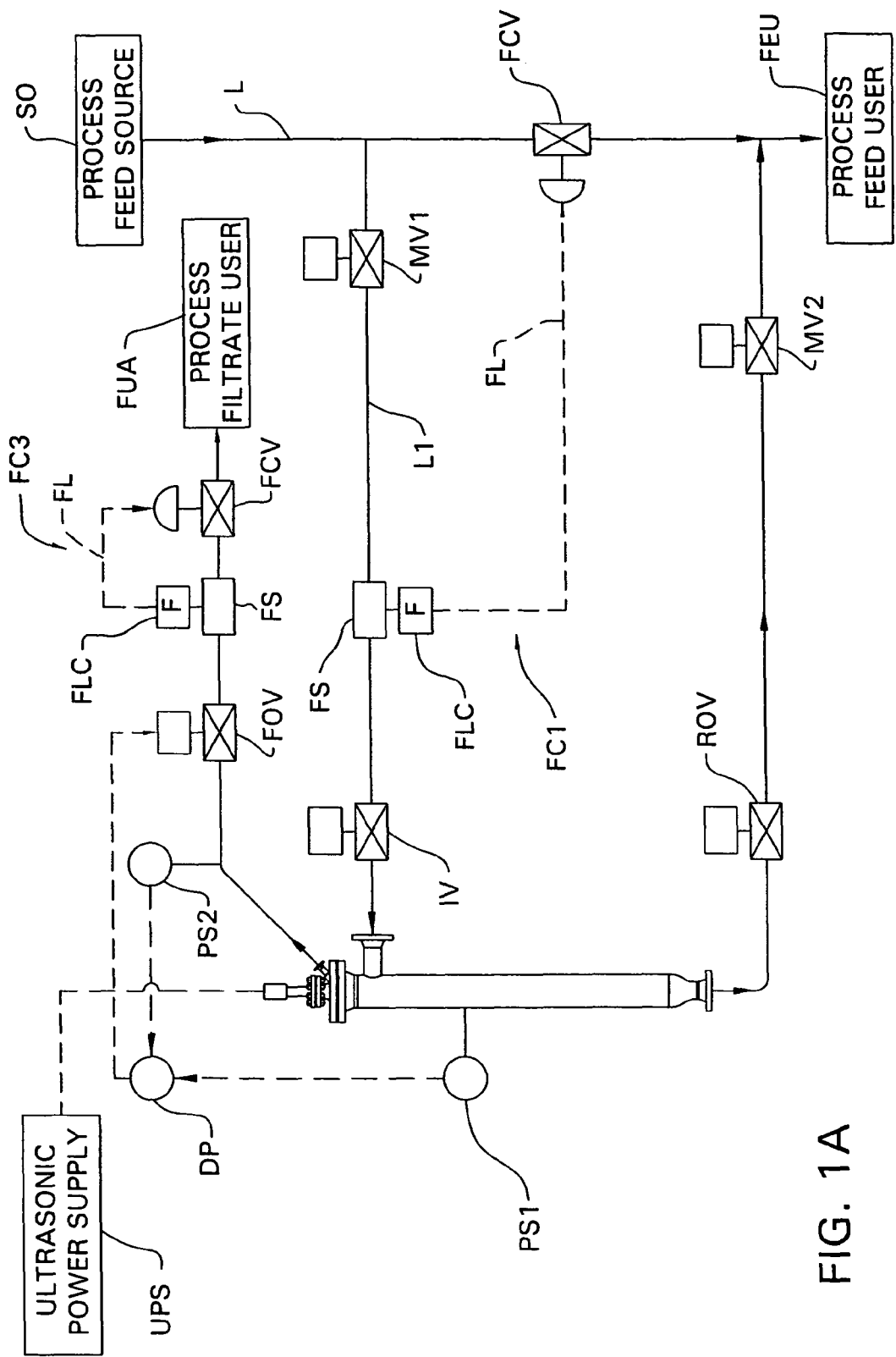
FIG. 1A shows a modification of the FIG. 1 system.

FIG. 1A shows a modification of the FIG. 1 system. The FIG. 1A system is preferably similar to the above described FIG. 1 system except as follows.

The FIG. 1 tank TK is optional and may not be possible in some customer applications. Thus, in the FIG. 1A system, the filter housing 20 takes feed liquid directly from the process liquid source SO. Thus, in FIG. 1A, the process feed liquid source SO outputs through a line L to the process feed user FEU and through the open inlet valve IV to the inlet port 30. A suitable restriction sufficient to divert the desired flow from line L to line L1 is interposed in the line L downstream of the L1. For the embodiment shown, such restriction comprises a conventional feedback flow control FC1, like the above-described control FC2, comprises a flow sensor FS which outputs a signal through a feedback loop controller FLC and feedback loop FL to control flow through a flow control valve FCV. In FIG. 1A, the flow sensor FS of the flow control FC1 is interposed in a branch line L1 between the process feed line L and the inlet valve IV, and the valve FCV is interposed in the line L downstream of the branch line L1. The control FC1 is appropriately sized to the desired process feed flow in line L and may be of the same general type as above-described control FC2, or may be a similar conventional control supplied by the customer in whose plant the system is installed.

In the FIG. 1A system, the FIG. 1 control FC2 is not needed and so is omitted, the retentate outlet valve ROV being connected to the process feed line L downstream of the flow control valve FCV of the control FC1 to flow retentate from the filter unit to the process feed user FEU.

The valves IV and ROV may be manually controlled, or controlled by a suitable, conventional remote or programmable controller (not shown), in which case it may be desired to interpose normally open manual valves MV1 and MV2 adjacent the line L, respectively in the branch line L1 and downstream of the retentate outlet valve ROV. The valves MV1 and MV2 may be closed to allow disconnection of the filter unit from the process feed line L.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A filter assembly for mounting in a filter housing having a liquid inlet and outlet through which process fluid is flowable, said filter assembly comprising:
   at least one generally tubular elongated filter element having first and second element ends, and an outer mesh cylinder extending lengthwise from the first element end to the second element end and having an exterior face extending between said first and second element ends which faces outwardly so as to be exposed to a feed liquid zone in a filter housing, and an interior face bounding a filter chamber in said filter element; and
   each said filter element having a generally tubular adapter at the first element end, said adapter extending endwise from said filter element and having an adapter length, said adapter having an enlarged inlet portion with an inlet inner diameter larger than an outer diameter of said filter element defined by said exterior face, said inlet portion defining an inlet end of said adapter, the inlet end engaged with said mesh cylinder to tight-fittingly receive said first element end therein with said exterior face nested within said inlet inner diameter to receive process fluid from said filter chamber, the adapter further having an elongated flow tube defining an outlet end of said adapter from which said filtered process fluid is discharged and having a flow tube inner diameter smaller than said inlet inner diameter, and a reducer passage that reduces the cross-sectional flow area between said inlet portion and said flow tube, said flow tube having a length, a first end, a second end, and an elongate portion that has a unitary single outer diameter along substantially the entire flow tube length and a unitary single inner diameter along substantially the entire flow tube length, the length comprising a majority of said adapter length.

2. The apparatus of claim 1, wherein said outlet end of said adapter has a compression fitting thereon which is engagable with a filter housing.

3. The apparatus of claim 2, wherein said filter assembly comprises a plurality of said filter elements arranged in a fixed array with said filter elements disposed in parallel spaced relation.

4. The apparatus of claim 3, wherein said filter assembly further includes a cage surrounding and extending along said filter elements, said cage comprising a first end member and a second end member which are axially spaced apart and include plural longitudinal guard members connecting said first and second end members in axially spaced relation, said first end member cooperating with and laterally locating said adapters in spaced relation, and said second end member laterally locating said second filter ends such that said filter elements are located in said parallel spaced relation.

5. The apparatus of claim 4, wherein said adapters extend past said first end member and include said compression fittings thereon, said first end member comprising a generally hoop shaped member having inner, circumferentially spaced openings receiving said adapters therethrough in radial and circumferential located relation.

6. The apparatus of claim 5, wherein said second end member comprises a spider-like member located adjacent the second ends of said filter elements, said spider-like member comprising (1) a hub portion, (2) a rim portion spaced outboard of said hub portion and having circumferentially spaced receivers receiving adjacent end portions of said second ends of said filter elements, and (3) circumferentially spaced spoke-like elements coupling said hub portion and rim portion and circumferentially spaced from each other by axial flow openings through said spider-like member.

7. The apparatus of claim 1, said filter assembly further includes a cage surrounding and extending along said filter element, said cage comprising a first end member and a second end member which are axially spaced apart and include plural longitudinal guard members connecting said first and second end members in axially spaced relation, said first end member cooperating with and laterally locating said adapter, and said second end member laterally locating said second filter end, said adapter extending past said first end member and include a fitting for securing said outlet to a filter housing.

8. The apparatus of claim 1, wherein said reducer passage has a peripheral wall which is smoothly curved between said inlet portion and said flow tube.

9. A filter assembly for mounting in a filter housing having a liquid inlet and outlet through which process fluid is flowable, said filter assembly comprising:
a generally tubular elongated filter element having first and second filter element ends, an outer cylinder having an exterior face facing outwardly so as to be exposed to a feed liquid zone in a filter housing and an interior face facing a filter chamber in said filter element, said filter chamber being generally cylindrically shaped, adapted to receive fluid to be filtered, and having a length to outer diameter ratio of at least 36 to 1; and
a generally tubular adapter having an inlet portion with an inlet inner diameter and defining an inlet end which tight-fittingly receives said first filter element end therein so as to be capable of receiving filtered process fluid from said filter chamber, said adapter extending endwise from said filter element and further comprising an elongated flow tube defining an outlet end of said adapter from which said filtered process fluid is discharged and having a flow tube inner diameter, and a reducer passage between said inlet portion and said flow tube, said reducer passage making about a 3 to 1 reduction in diameter from said inlet inner diameter to said flow tube inner diameter.

10. The apparatus of claim 9, wherein said filter assembly comprises a plurality of said filter elements and adapters arranged in a fixed array with said filter elements disposed in parallel spaced relation.

11. The apparatus of claim 9, wherein said filter assembly further includes a cage surrounding and extending along said filter element and said adapter, said cage comprising a first end member and a second end member which are axially spaced apart and comprising plural longitudinal guard members connecting said first and second end members in axially spaced relation, said first end member cooperating with and laterally locating said adapter, and said second end member laterally locating said second filter end, said adapter extending past said first end member and include a fitting for securing said outlet to a filter housing.

12. The apparatus of claim 9, wherein said reducer passage comprises a wall which is smooth and sinuously-curved in shape.

13. The apparatus of claim 9, wherein said adapter is generally funnel-shaped.

14. The apparatus of claim 9, wherein said adapter has an adapter length between said inlet end and said outlet end, said reducer passage having a length which comprises about 15-20% of said adapter length.

15. A filter assembly for mounting in a filter housing having a liquid inlet and outlet through which process fluid is flowable, said filter assembly comprising:
at least one tubular elongated perforate filter element having first and second element ends and an outer mesh cylinder extending lengthwise from the first element end to the second element end, said mesh cylinder having an exterior face which faces outwardly so as to be exposed to a feed liquid zone in a filter housing and defining an outer filter element diameter between said first and second element ends and having an interior face bounding a cylindrically-shaped filter chamber in said filter element; and
each said filter element having a generally funnel-shaped adapter at the first element end, said adapter extending endwise from said filter element and having an adapter length, said adapter having an enlarged cylindrical inlet portion with an inlet inner diameter, said inlet portion defining an inlet end of said adapter, the inlet end engaged with said mesh cylinder to fixedly tight-fittingly receive said first element end therein and to receive process fluid from said filter chamber, the adapter further having an elongated flow tube defining an outlet end of said adapter from which said filtered process fluid is discharged and having a flow tube inner diameter smaller than said inlet inner diameter, and a reducer passage between said inlet portion and said flow tube, said reducer passage comprising a smooth and sinuously-curved wall and having a reducer length, said flow tube having a length that comprises a majority of said adapter length, said reducer length comprising about 15-20% of said adapter length, and said reducer passage making about a 3 to 1 reduction in diameter from said outer filter element diameter to said flow tube inner diameter.

16. A filter assembly for mounting in a filter housing having a liquid inlet and outlet through which process fluid is flowable, said filter assembly comprising:
a plurality of generally tubular elongated filter elements arranged in a fixed array and disposed in parallel spaced relation, each said filter element having first and second element ends, and an outer mesh cylinder extending lengthwise from the first element end to the second element end and having an exterior face extending between said first and second element ends which faces outwardly so as to be exposed to a feed liquid zone in a filter housing, and an interior face bounding a filter chamber in said filter element; and
each said filter element having a generally tubular adapter at the first element end, said adapter extending endwise from said filter element and having an adapter length, said adapter having an enlarged inlet portion with an inlet inner diameter, said inlet portion defining an inlet end of said adapter, the inlet end engaged with said mesh cylinder to tight-fittingly receive said first element end therein and to receive process fluid from said filter chamber, the adapter further having an elongated flow tube defining an outlet end of said adapter from which said filtered process fluid is discharged and having a flow tube inner diameter smaller than said inlet inner diameter, and a reducer passage between said inlet portion and said flow tube, said flow tube having a length that comprises a majority of said adapter length, said outlet end of said adapter having a compression fitting thereon which is engagable with a filter housing; and
a cage surrounding and extending along said filter elements, said cage comprising a first end member and a second end member which are axially spaced apart and include plural longitudinal guard members connecting said first and second end members in axially spaced relation, said first end member cooperating with and laterally locating said adapters in spaced relation, and said second end member laterally locating said second filter ends such that said filter elements are located in said parallel spaced relation.

17. The apparatus of claim 16, wherein said adapters extend past said first end member and include said compression fittings thereon, said first end member comprising a generally hoop shaped member having inner, circumferentially spaced openings receiving said adapters therethrough in radial and circumferential located relation.

18. The apparatus of claim 16, wherein said second end member comprises a spider-like member located adjacent the second ends of said filter elements, said spider-like member comprising (1) a hub portion, (2) a rim portion spaced outboard of said hub portion and having circumferentially spaced receivers receiving adjacent end portions of said second ends of said filter elements, and (3) circumferentially spaced spoke-like elements coupling said hub portion and rim portion and circumferentially spaced from each other by axial flow openings through said spider-like member.

19. A filter assembly for mounting in a filter housing having a liquid inlet and outlet through which process fluid is flowable, said filter assembly comprising:
  at least one generally tubular elongated filter element having first and second element ends, and an outer mesh cylinder extending lengthwise from the first element end to the second element end and having an exterior face extending between said first and second element ends which faces outwardly so as to be exposed to a feed liquid zone in a filter housing, and an interior face bounding a filter chamber in said filter element; and
  each said filter element having a generally tubular adapter at the first element end, said adapter extending endwise from said filter element and having an adapter length, said adapter having an enlarged inlet portion with an inlet inner diameter, said inlet portion defining an inlet end of said adapter, the inlet end engaged with said mesh cylinder to tight-fittingly receive said first element end therein and to receive process fluid from said filter chamber, the adapter further having an elongated flow tube defining an outlet end of said adapter from which said filtered process fluid is discharged and having a flow tube inner diameter smaller than said inlet inner diameter, and a reducer passage between said inlet portion and said flow tube, said flow tube having a length that comprises a majority of said adapter length; and
  a cage surrounding and extending along said filter element, said cage comprising a first end member and a second end member which are axially spaced apart and include plural longitudinal guard members connecting said first and second end members in axially spaced relation, said first end member cooperating with and laterally locating said adapter, and said second end member laterally locating said second filter end, said adapter extending past said first end member and including a fitting for securing said outlet to a filter housing.

20. A filter assembly for mounting in a filter housing having a liquid inlet and outlet through which process fluid is flowable, said filter assembly comprising:
  a generally tubular elongated filter element having first and second filter element ends, an outer cylinder having an exterior face facing outwardly so as to be exposed to a feed liquid zone in a filter housing and an interior face facing a filter chamber in said filter element, said filter chamber being generally cylindrically shaped and adapted to receive fluid to be filtered;
  a generally tubular adapter having an inlet portion with an inlet inner diameter and defining an inlet end which tight-fittingly receives said first filter element end therein so as to be capable of receiving filtered process fluid from said filter chamber, said adapter extending endwise from said filter element and further comprising an elongated flow tube defining an outlet end of said adapter from which said filtered process fluid is discharged and having a flow tube inner diameter, and a reducer passage between said inlet portion and said flow tube, said reducer passage making about a 3 to 1 reduction in diameter from said inlet inner diameter to said flow tube inner diameter; and
  a cage surrounding and extending along said filter element and said adapter, said cage comprising a first end member and a second end member which are axially spaced apart and comprising plural longitudinal guard members connecting said first and second end members in axially spaced relation, said first end member cooperating with and laterally locating said adapter, and said second end member laterally locating said second filter end, said adapter extending past said first end member and include a fitting for securing said outlet to a filter housing.

21. A filter assembly for mounting in a filter housing, said filter assembly comprising:
  at least one generally tubular elongated filter element having first and second element ends, and an outer rigid metal mesh cylinder extending lengthwise from the first element end to the second element end and having an exterior face extending between said first and second element ends which faces outwardly so as to be exposed to a feed liquid zone in a filter housing, and an interior face bounding a filter chamber in said filter element; and
  each said filter element having a generally tubular adapter at the first element end, said adapter extending endwise from said filter element and having an adapter length, said adapter having an enlarged inlet portion with an inlet inner diameter, said inlet portion defining an inlet end of said adapter, the inlet portion welded to said outer rigid metal mesh cylinder to tight-fittingly receive said filter element first element end therein and to receive process fluid from said filter chamber, the adapter further having an elongated flow tube defining an outlet end of said adapter from which said filtered process fluid is discharged and having a flow tube inner diameter smaller than said inlet inner diameter, and a reducer passage that reduces the cross-sectional flow area from said inlet portion to said flow tube, said flow tube having a length comprising a majority of said adapter length.

* * * * *